United States Patent
Kumada

(10) Patent No.: US 8,654,377 B2
(45) Date of Patent: Feb. 18, 2014

(54) DATA COMMUNICATION DEVICE, COMMUNICATION CONTROL METHOD, AND PROGRAM

(75) Inventor: Masashi Kumada, Aichi (JP)

(73) Assignee: Sony Corporation, Tokyo (JP)

( * ) Notice: Subject to any disclaimer, the term of this patent is extended or adjusted under 35 U.S.C. 154(b) by 667 days.

(21) Appl. No.: 12/589,625

(22) Filed: Oct. 26, 2009

(65) Prior Publication Data

US 2010/0123924 A1    May 20, 2010

(30) Foreign Application Priority Data

Nov. 20, 2008    (JP) ................ P2008-296335

(51) Int. Cl.
  *H04B 3/46*    (2006.01)
  *H04B 14/06*   (2006.01)
  *H04B 1/38*    (2006.01)
  *H04J 3/16*    (2006.01)

(52) U.S. Cl.
  USPC .......... 358/1.15; 375/225; 375/252; 375/220; 370/470; 700/22; 700/18

(58) Field of Classification Search
  USPC ............ 358/1.15; 326/86; 370/465, 242, 243; 477/63, 123, 125, 131
  See application file for complete search history.

(56) References Cited

U.S. PATENT DOCUMENTS

| | | | | |
|---|---|---|---|---|
| 3,724,293 | A | * | 4/1973 | Wakamatsu et al. .......... 477/131 |
| 4,208,925 | A | * | 6/1980 | Miller et al. ..................... 477/63 |
| 5,265,004 | A | * | 11/1993 | Schultz et al. .................. 700/22 |
| 5,371,736 | A | * | 12/1994 | Evan .............................. 370/470 |
| 5,627,858 | A | * | 5/1997 | Mak et al. ...................... 375/225 |
| 6,041,062 | A | * | 3/2000 | Yamato et al. ................ 370/465 |
| 6,911,843 | B2 | * | 6/2005 | Mizumoto et al. .............. 326/86 |
| 2004/0234010 | A1 | * | 11/2004 | Wei et al. ....................... 375/346 |

FOREIGN PATENT DOCUMENTS

| | | | | |
|---|---|---|---|---|
| JP | S57-099062 | A | | 6/1982 |
| JP | H03-057349 | A | | 3/1991 |
| JP | H04-111637 | A | | 4/1992 |
| JP | H07-264263 | A | | 10/1995 |
| JP | H08-125712 | A | | 5/1996 |
| JP | 2001-168853 | A | | 6/2001 |
| JP | 2001168853 | A | * | 6/2001 ............... H04L 7/04 |
| JP | 2004-538687 | | * | 12/2004 |
| JP | 2004-538687 | A | | 12/2004 |
| JP | 2005-072657 | A | | 3/2005 |
| JP | 2007-259094 | A | | 10/2007 |

OTHER PUBLICATIONS

Japanese Office Action issued on Sep. 4, 2012 in Patent Application No. 2008-296335.

* cited by examiner

*Primary Examiner* — Akwasi M Sarpong
(74) *Attorney, Agent, or Firm* — Sony Corporation

(57) ABSTRACT

A data communication device includes: a communication execution unit that executes serial communication of an asynchronous type; a bit variance detection block that detects a variance between bits in communication data which the communication execution unit receives from a remote communicating party; a timer that measures a low-level pulse width which is a low-level pulse duration and which is determined with the position of the variance between bits detected by the bit variance detection block; and a control unit that performs transmission speed recognizing processing on the communication data according to the low-level pulse width measured by the timer, wherein based on the confirmation that the low-level pulse width is a low-level pulse width equivalent to a bit width compatible with low-speed communication data, the control unit recognizes the transmission speed for the communication data as a low speed.

18 Claims, 14 Drawing Sheets

EXAMPLE OF COMMUNICATION TOPOLOGY

EXAMPLE OF COMMUNICATION DATA

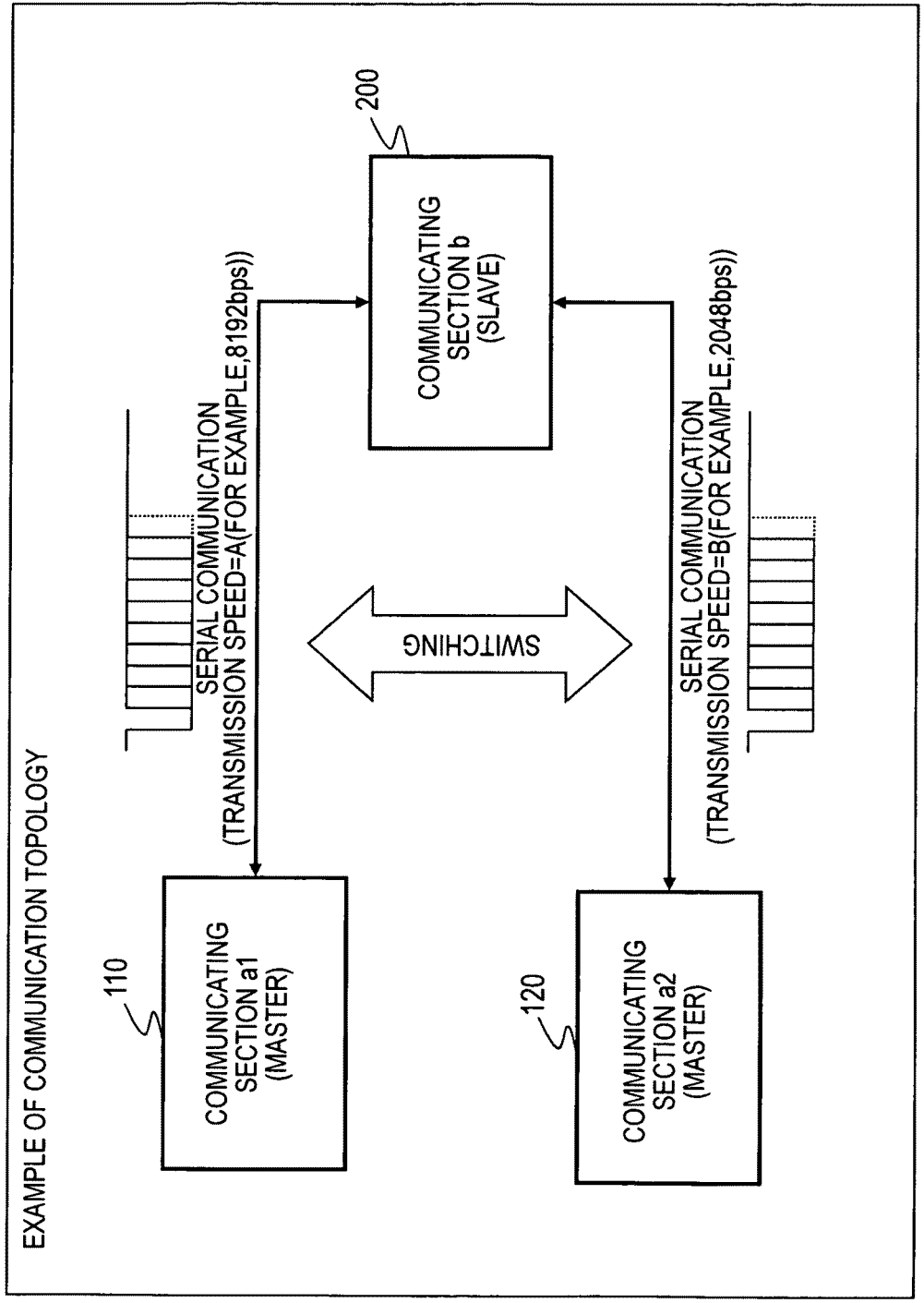

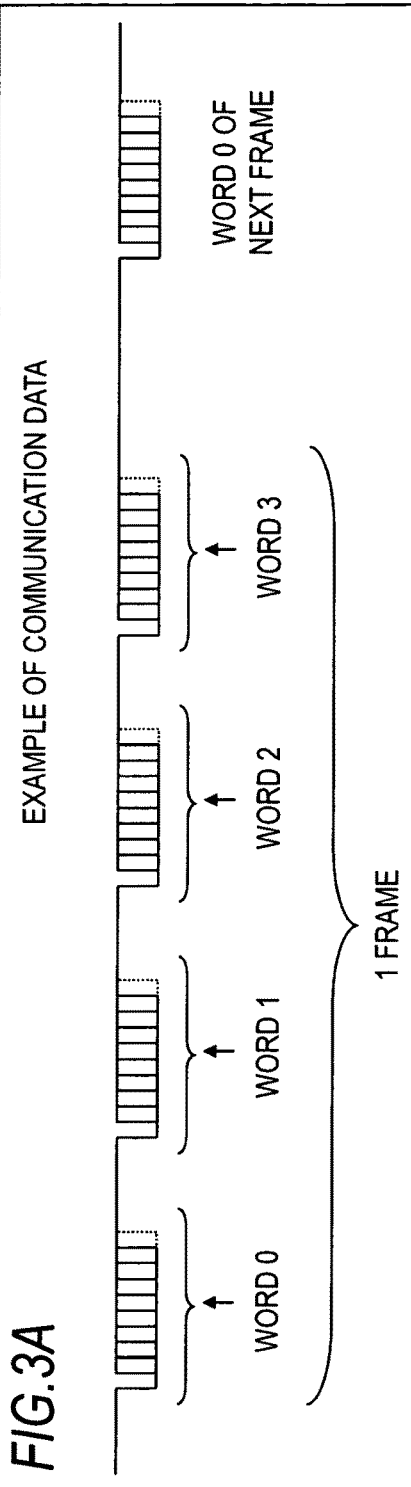
FIG.3A  EXAMPLE OF COMMUNICATION DATA
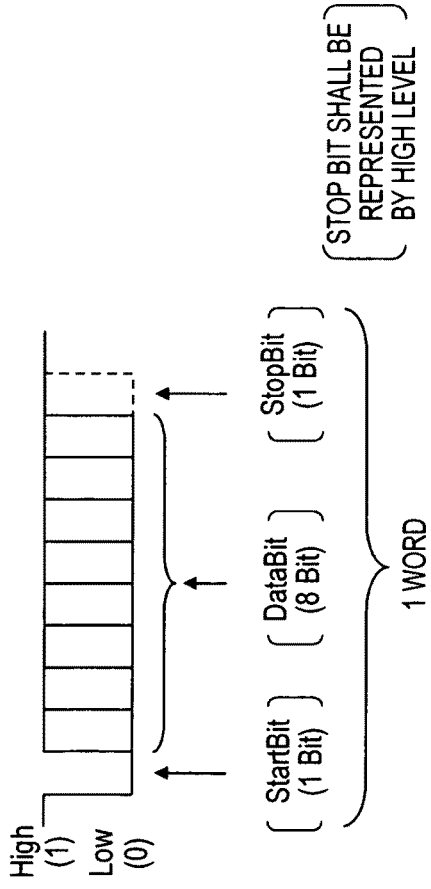
FIG.3B  EXAMPLE OF WORD STRUCTURE

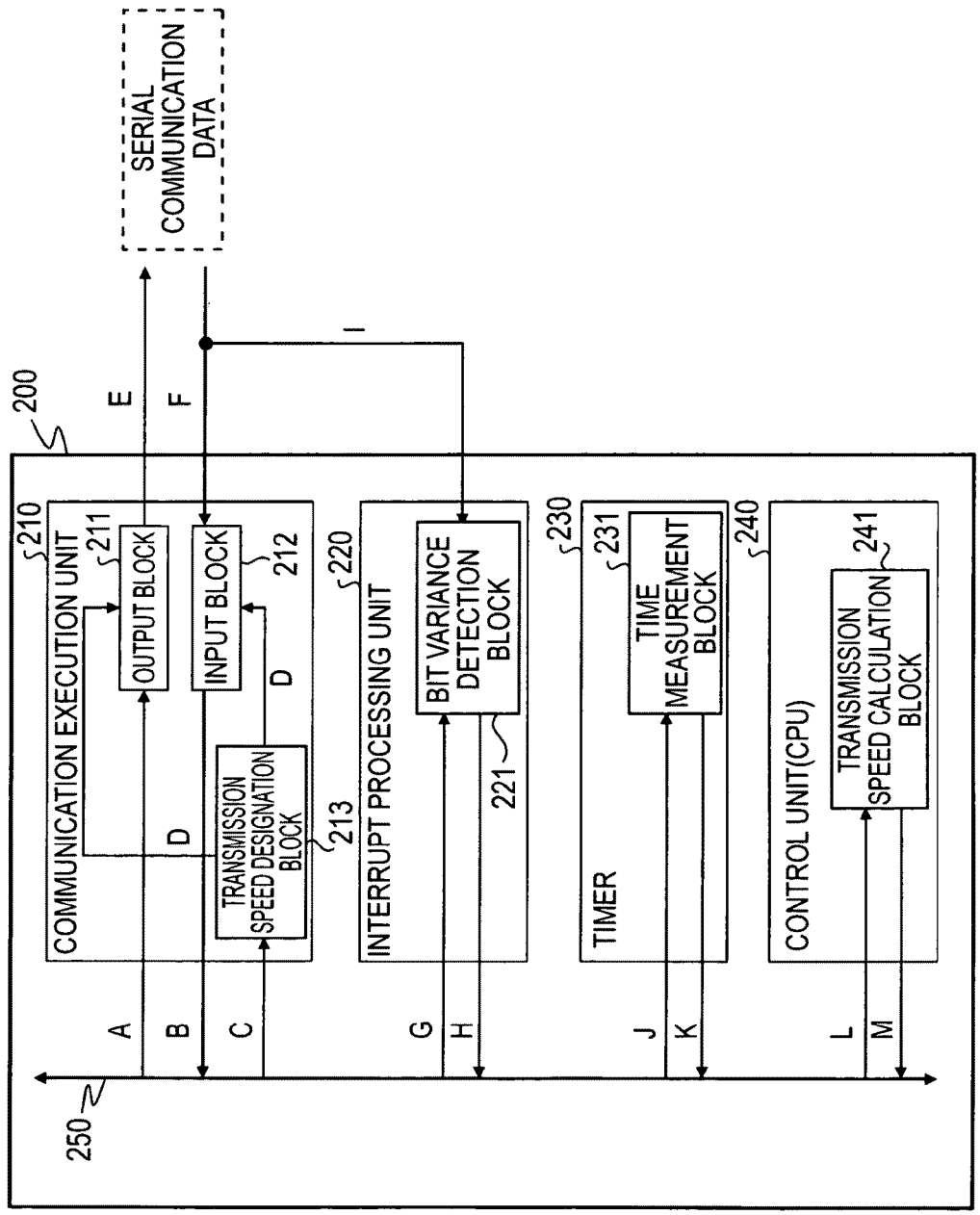

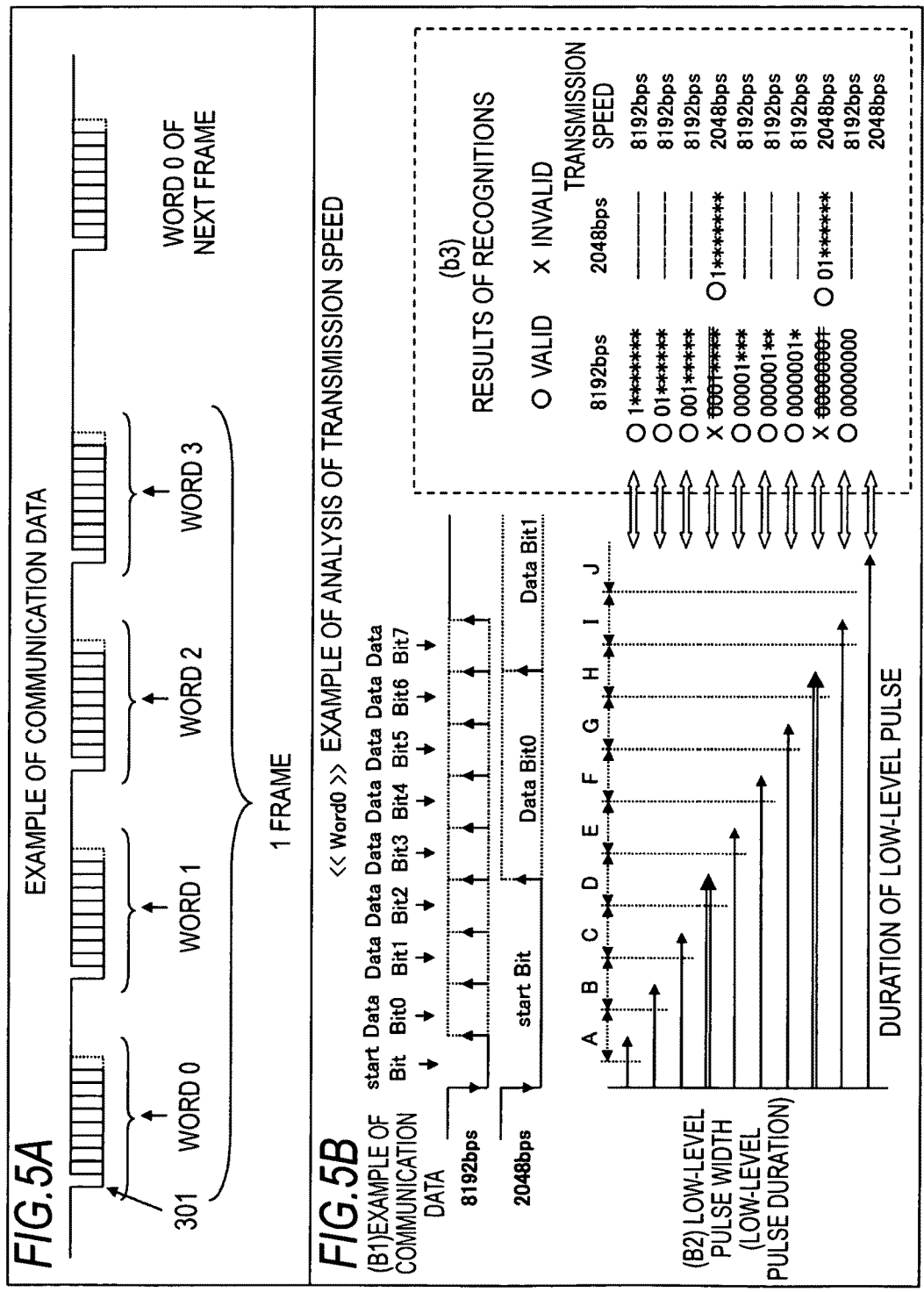

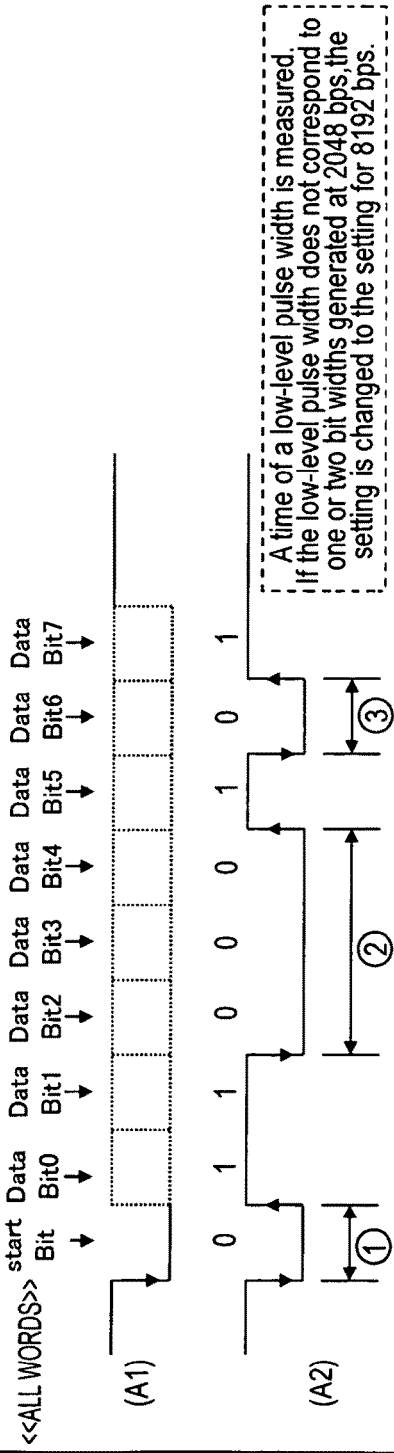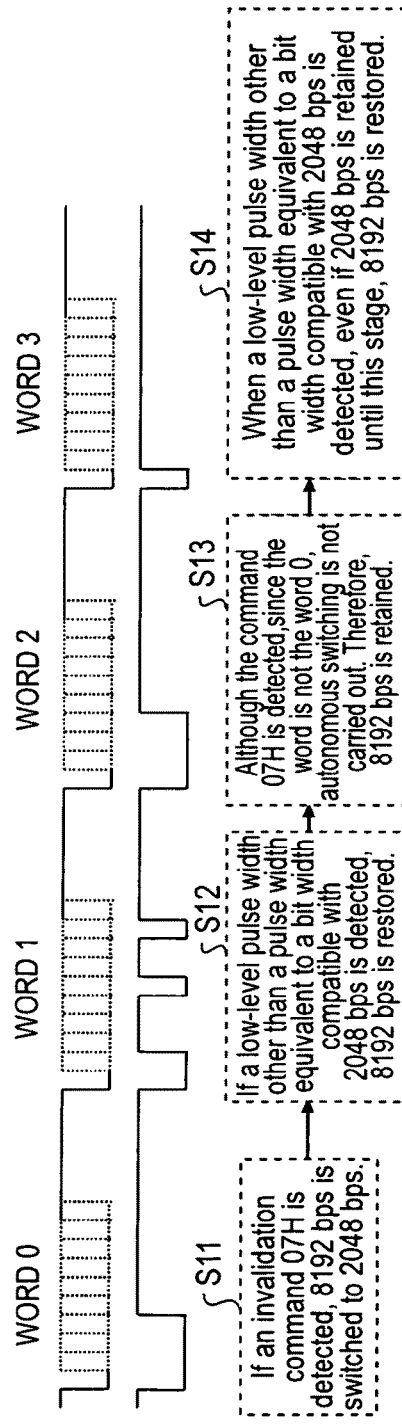

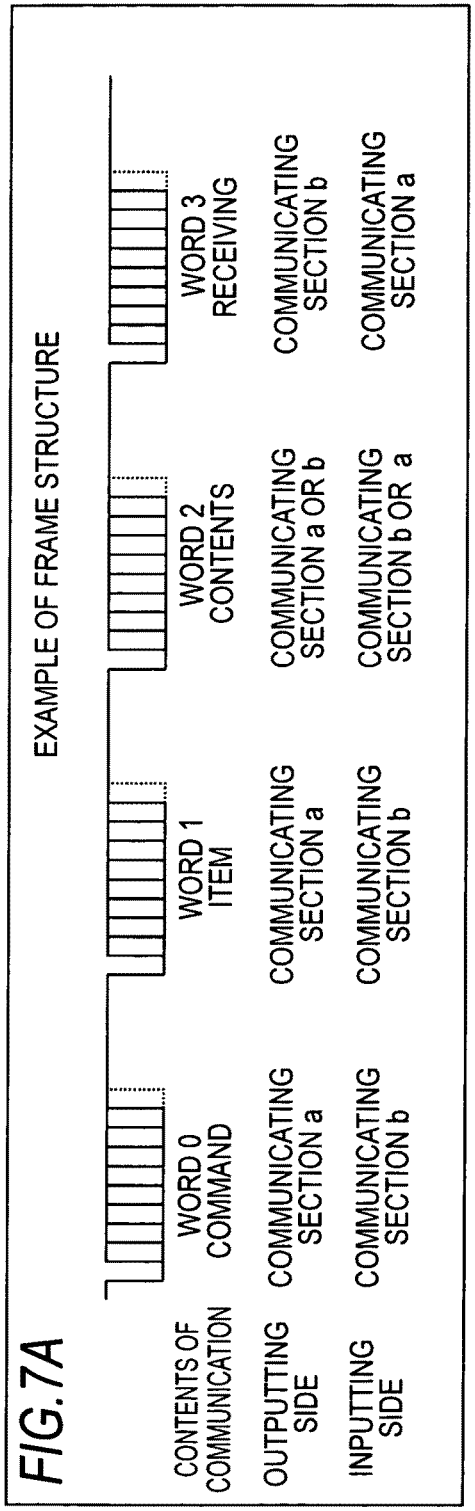

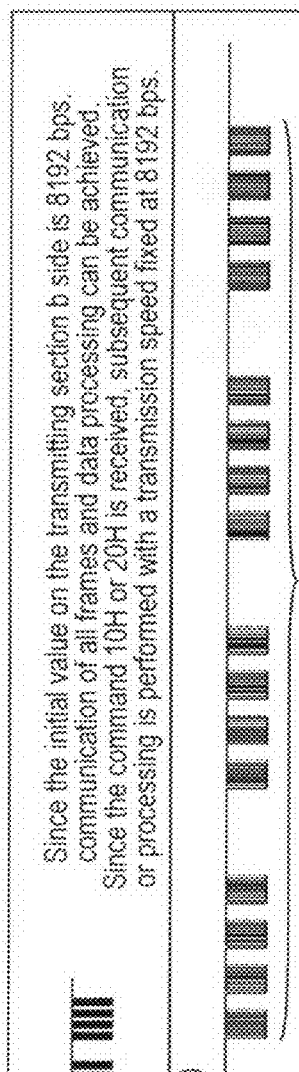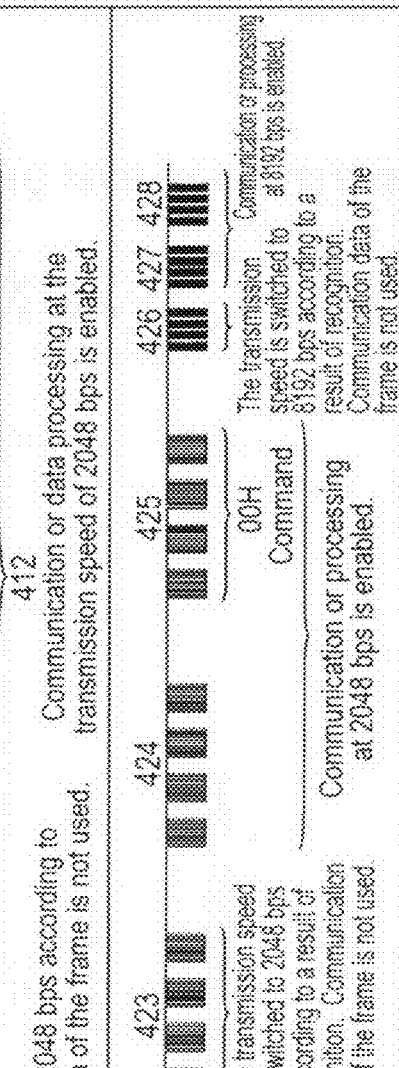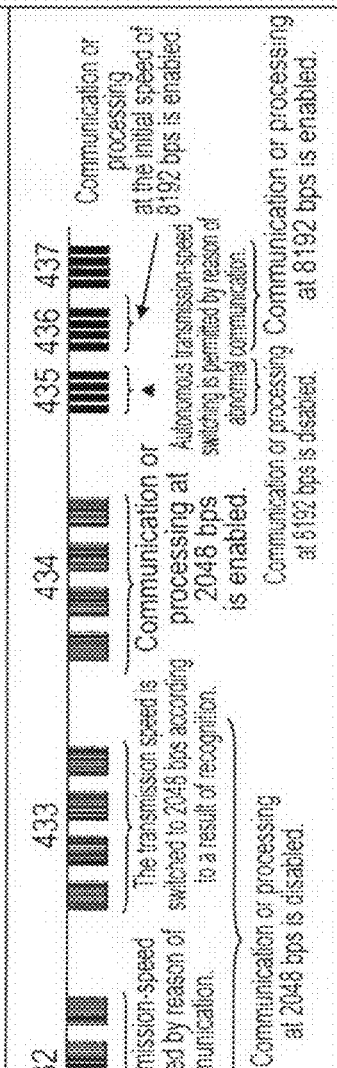

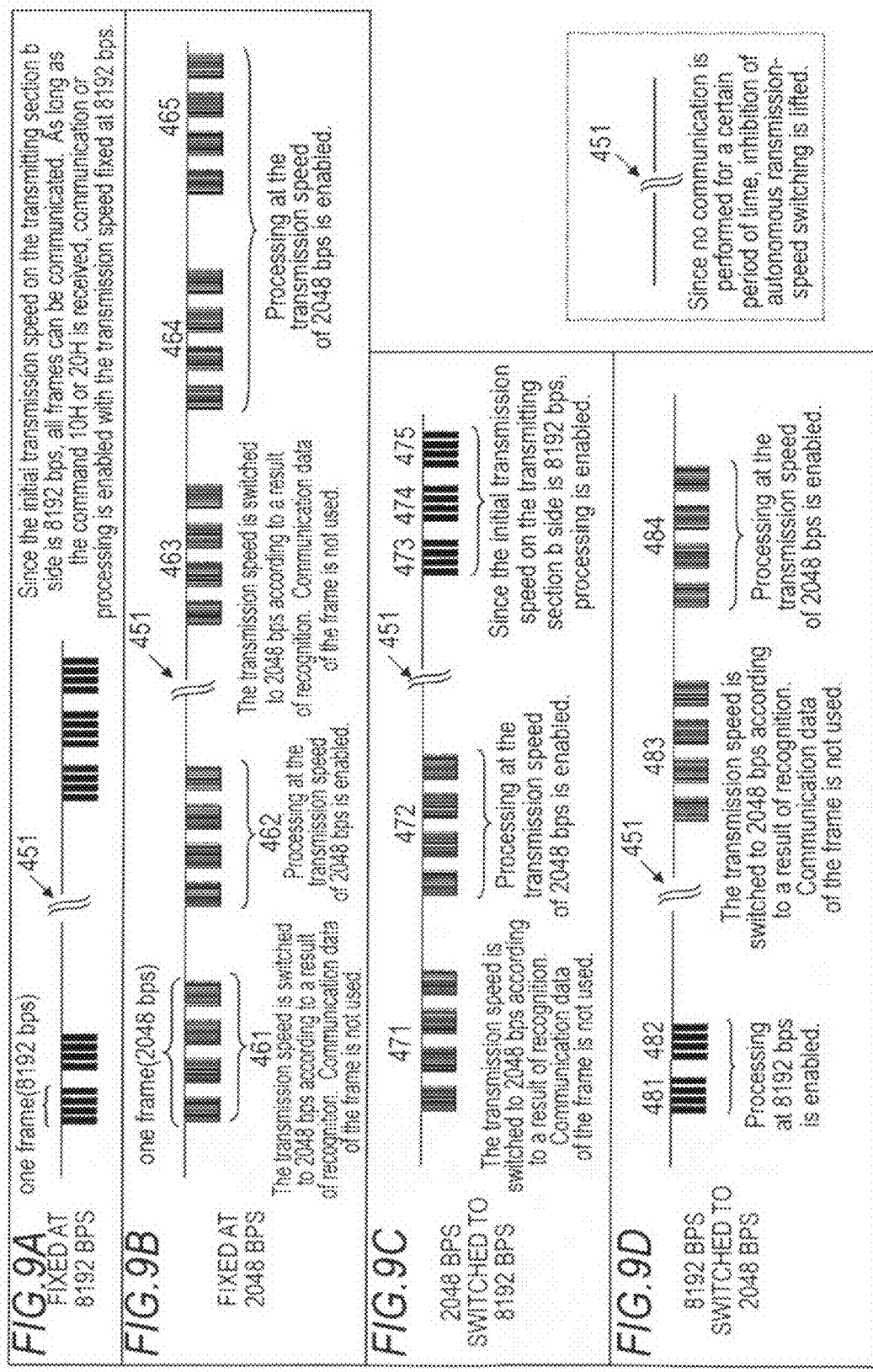

FIG.10A

FIXED AT 2048 BPS

511 — one frame=one word (2048 bps)

512 513 — Processing at the transmission speed of 2048 bps is enabled.

The transmission speed is switched to 2048 bps according to a result of recognition. The word is not used.

FIG.10B

2048 BPS AND 8192 BPS MIXED one frame=one word (8192 bps)

Switching in response to the command 00H 521 00H Command — 522, 523, 524 00H Command, 525

Processing at 8192 bps is enabled.

The transmission speed is switched to 2048 bps according to a result of recognition. The word is not used.

Communication at 2048 bps is enabled.

Processing at the transmission speed is switched to 8192 bps according to a result of recognition. The word is not used.

Processing at 8192 bps is enabled (8192 bps is an initial transmission speed).

FIG.10C

2048 BPS AND 8192 BPS MIXED

Switching in the transmission-speed switching inhibited state 531, 532, 533, 534, 535 536

Autonomous transmission-speed switching is permitted by reason of abnormal communication.

Processing at 8192 bps is enabled.

The transmission speed is switched to 2048 bps according to a result of recognition. The word is not used.

Processing at 2048 bps is disabled.

Processing at 2048 bps is enabled.

The transmission speed is switched to 8192 bps according to a result of recognition. The word is not used.

Processing at 8192 bps is enabled (8192 bps is an initial transmission speed).

Since a low-level pulse width beginning with a pulse, which represents a start bit in a word 0, is detected, the transmission speeds can be automatically switched in order to output one word alone.

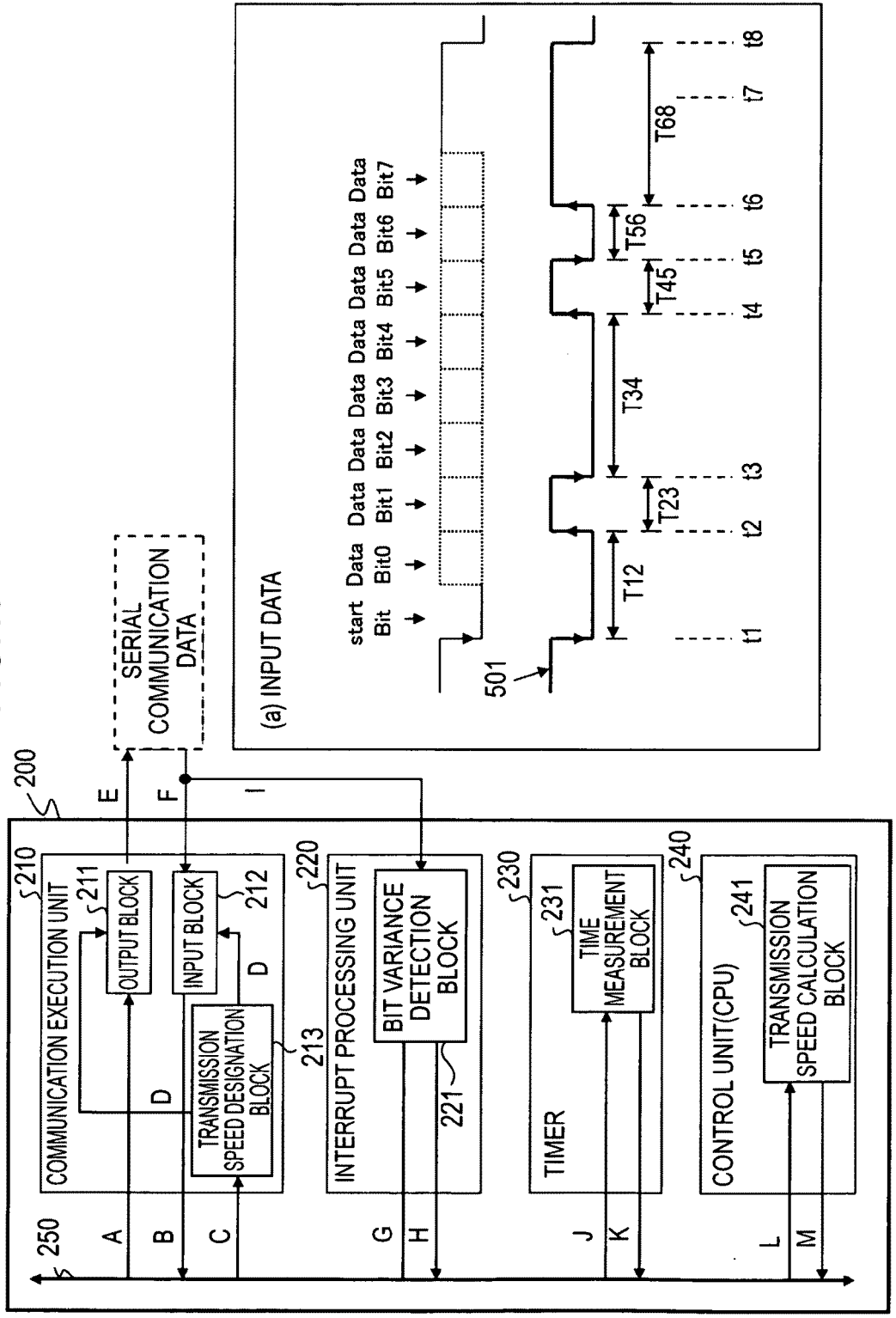

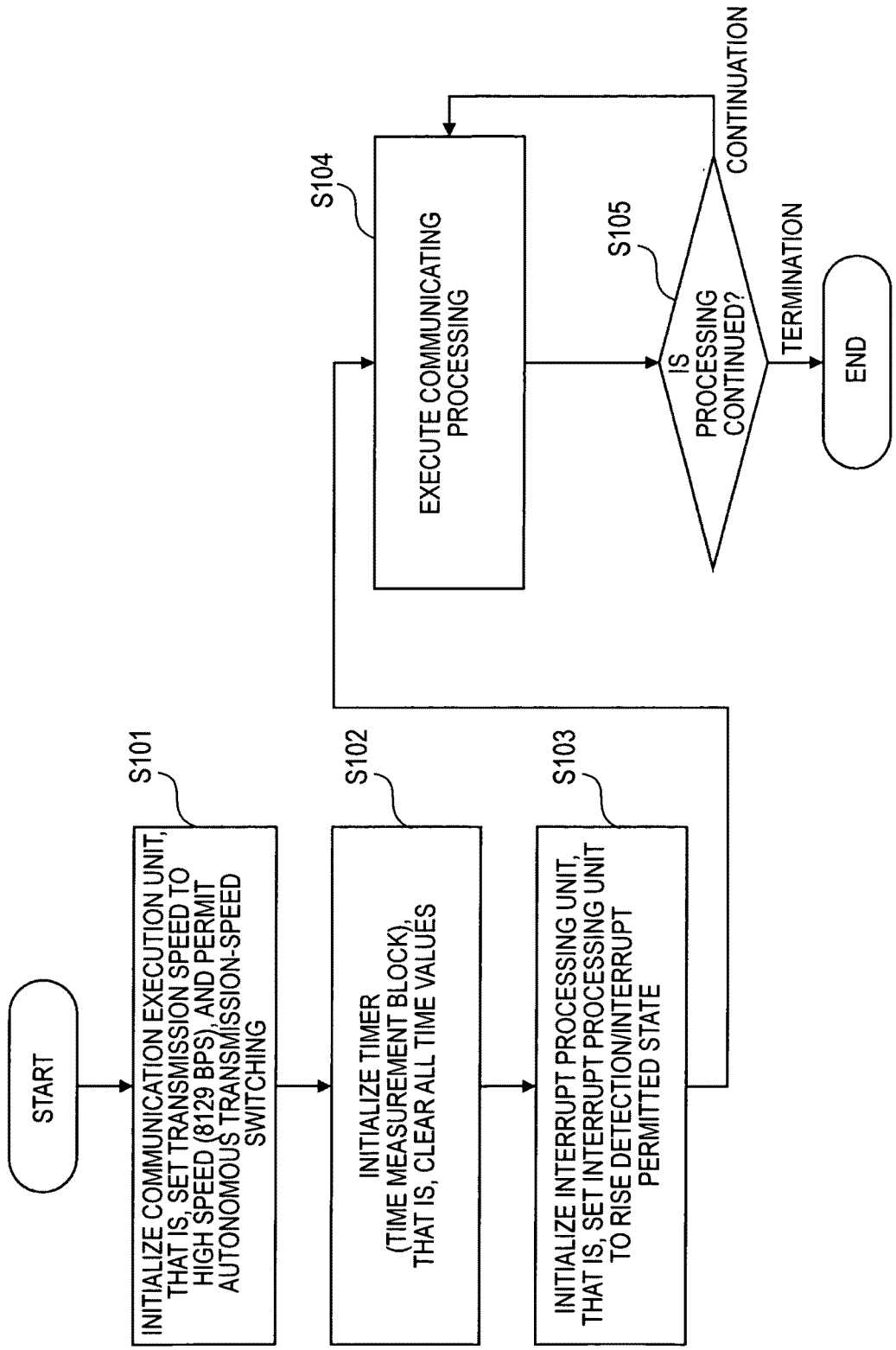

DATA COMMUNICATION DEVICE, COMMUNICATION CONTROL METHOD, AND PROGRAM

CROSS-REFERENCE TO RELATED APPLICATION

The present application claims priority from Japanese Patent Application JP 2008-296335 filed in the Japanese Patent Office on Nov. 20, 2008, the entire content of which is hereby incorporated by reference.

BACKGROUND OF THE INVENTION

1. Field of the Invention

The present invention relates to a data communication device, a communication control method, and a program. More particularly, the present invention is concerned with a data communication device, a communication control method, and a program that perform serial communication of an asynchronous type.

2. Description of the Related Art

As one of communication methods of communicating data through serial communication, an asynchronous method is known. Referring to FIGS. 1A and 1B, serial data communication conformable to the asynchronous method will be outlined below. FIG. 1A shows an example of a communication topology for serial data communication conformable to the asynchronous method, and FIG. 1B shows an example of a data structure for communication data.

For example, serial data communication is performed between a communicating section (master) 10 and a communicating section (slave) 20 shown in FIG. 1A. Each of the communicating section (master) 10 and communicating section (slave) 20 has a transmitting/receiving terminal, and performs data transmission or data reception by way of the transmitting/receiving terminal.

Communication data to be transferred between the communicating section (master) 10 and communicating section (slave) 20 is, as shown in FIG. 1B, structured to have data, which is an object of transmission, sandwiched between a start bit and a stop bit. More particularly, for example, the start bit is one bit long, the data is 8 bits long, and the stop bit is one bit long.

The thus structured communication data is produced on a transmitting side and outputted to a receiving side. The communication data having the data sandwiched in units of one byte (8 bits) between the start bit and stop bit is produced and transmitted.

The communication data shown in FIG. 1B is successively transferred according to an amount of data forming transmission data. For example, when data of 16 bytes long is transmitted, sixteen communication data items each of which is identical to the one shown in FIG. 1B are produced and transmitted at predetermined intervals. The data receiving side recognizes data, which is sandwiched between a start bit and a stop bit, as data that is an object of reception. For example, the start bit is defined as one bit of 0 representing a low level and the stop bit is defined as one bit of 1 representing a high level. The receiving side discriminates the start and stop bits from the data according to this rule, and acquires and analyzes the intermediate data.

The example shown in FIG. 1B is an example in which data of 8 bits long is sandwiched between the start and stop bits. The data sandwiched between the start and stop bits is not limited to the data of 8 bits long. For example, a parity bit for error correction may be appended to the 8-bit data.

For discriminating the start and stop bits from data on the data receiving side, information on a bit width is necessary. Both the transmitting and receiving sides are requested to share the same understanding of the bit width. The data receiving side uses a clock to detect the bit width, and acquires the data according to the foregoing technique.

The width of one bit may be set to various values. If the bit width is set to a short time, a transmission speed is raised. The data receiving side recognizes a data transmission speed by measuring the bit width of the start bit. More particularly, the number of clock pulses of a clock signal, which is employed on the receiving side, equivalent to the bit width of the start bit is counted.

The transmission speed in serial data communication is often expressed with a baud rate defined as the number of bits per second (bps or bits per second). The data transmitting side and data receiving side are requested to treat data at the same baud rate. Therefore, a preset baud rate may be utilized for serial communication. Otherwise, the transmitting side checks the baud rate employed on the receiving side, produces transmission data at the same baud rate as the baud rate employed on the receiving side, and then transmits the data.

The transmitting side checks the baud rate employed on the receiving side by performing processing described below. To begin with, the transmitting side executes test transmission at multiple baud rates, and checks whether a response is returned from the receiving side. The transmitting side recognizes a baud rate, at which a response is returned from the receiving side, as a baud rate usable on the receiving side. The transmitting side performs real transmission of data at the baud rate. If this kind of preprocessing is carried out, both the data transmitting side and data receiving side can treat data at the same baud rate.

The data receiving side identifies the number of clock pulses equivalent to the bit width of the start bit, and uses the number of clock pulses as a reference to check whether each of the bits of data is 1 or 0. For accurate transmission or reception of data, it is necessary to accurately measure the bit width of the start bit.

However, as shown in FIG. 1B, the start bit and data are adjoined to each other, and may not be clearly discriminated from each other. For example, when the start bit is defined as one bit of 0 representing a low level, if the first bit of the succeeding data is the same as the start bit of 0 representing the low level, it becomes hard to identify the border between the start bit and data. In this case, it is hard to measure the bit width.

As a related art in which a technique for solving the foregoing problem is disclosed, there is patent document 1 (JP-A-2007-259094). According to the patent document 1, a start bit is alternating data of two bits long, that is, includes two bits of 10 or 01. Owing to the data length, the receiving side can reliably detect both the leading and trailing edges of a pulse representing a bit contained in the start bit, and can detect the bit width highly precisely.

According to patent document 2(JP-A-2001-168853), a special command for measurement of a bit width is prepared. A receiving side uses the command to measure the bit width of a start bit.

Owing to the constitutions of the related arts, measurement of a bit width can be highly precisely achieved. However, the technique disclosed in the patent document 1 uses two bits for the start bit. The occupation ratio of the start bit to transfer data gets higher. As a result, a data transmission rate decreases.

According to the technique disclosed in the patent document 2, the special command has to be transmitted and receive in advance for the purpose of measurement. This poses a problem in that processing efficiency is degraded. In addition, if the data transmitting side changes transmission speeds, that is, baud rates, every time the necessity of speed changing processing occurs, the special command has to be transmitted for measurement. In a configuration in which changing transmission speeds arises, the processing efficiency is markedly degraded.

The patent document 1 refers to JP-A-2007-259094, and the patent document 2 refers to JP-A-2001-168853.

SUMMARY OF THE INVENTION

The present invention addresses the foregoing problems. There is a need for a data communication device, a communication control method, and a program in which even when a data transmitting side in a configuration, in which serial communication processing is performed according to an asynchronous method, changes transmission speeds, a data receiving side can analyze transfer data by correctly detecting a bit width.

According to an embodiment of the present invention, there is provided a data communication device including:

a communication execution unit that executes serial communication of an asynchronous type;

a bit variance detection block that detects a variance between bits of communication data the communication execution unit receives from a remote communicating party;

a timer that measures a low-level pulse width which is a low-level pulse duration and is determined with the position of the variance between bits detected by the bit variance detection block; and a control unit that performs transmission speed recognizing processing on the communication data according to the low-level pulse width measured by the timer.

Based on the confirmation that the low-level pulse width is a low-level pulse width equivalent to a bit width compatible with low-speed communication data, the control unit recognizes the transmission speed for the communication data as a low speed.

In the data communication device according to the embodiment of the present invention, when the data communication device is set to a high-speed communication mode, if the control unit recognizes the transmission speed for the communication data as the low speed, the control unit implements control so as to set the communication mode to a low-speed communication mode.

Further, in the data communication device according to the embodiment of the present invention, based on the confirmation that the low-level pulse width is not a low-level pulse width equivalent to a bit width compatible with low-speed communication data, the control unit recognizes the transmission speed for the communication data as a high speed.

Further, in the data communication device according to the embodiment of the present invention, when the data communication device is set to the low-speed communication mode, if the control unit recognizes the transmission speed for the communication data as the high speed, the control unit implements control so as to set the communication mode to the high-speed communication mode.

Further, in the data communication device according to the embodiment of the present invention, the control unit inputs information on detection of a fall of a signal, which represents the communication data, from the bit variance detection block, instructs the timer to initiate time measurement with the detection as a trigger, inputs information on detection of a rise of the signal, which represents the communication data, from the bit variance detection block, instructs the timer to terminate the time measurement with the detection as a trigger, and acquires information on the low-level pulse width.

Further, in the data communication device according to the embodiment of the present invention, the control unit inputs information on detection of a fall of a signal, which corresponds to the position of the beginning of a start bit in the leading word of a frame of communication data, from the bit variance detection block, instructs the timer to initiate time measurement with the detection as a trigger, inputs information on detection of a rise of the signal, which occurs of the communication data, from the bit variance detection block, instructs the timer to terminate the time measurement with the detection as a trigger, and acquires information on the low-level pulse width.

Further, in the data communication device according to the embodiment of the present invention, the control unit includes, as data for use in recognizing high-speed communication data or low-speed communication data as communication data, a table in which multiple values of a low-level pulse width are listed in association with high-speed communication or low-speed communication, references the table, and performs transmission speed recognizing processing on the communication data according to the low-level pulse width measured by the timer.

Further, in the data communication device according to the embodiment of the present invention, the control unit changes a transmission-speed switching permitted mode and a transmission-speed switching inhibited mode in response to a command contained in the communication data.

Further, in the data communication device according to the embodiment of the present invention, the data communication device is a battery that has a communicating section and is attachable or detachable to or from a main body of an information processing system, and is designed to execute processing of communicating with the remote communicating party.

Further, in the data communication device according to the embodiment of the present invention, the remote communicating party is a camera to which the battery is attached.

According to another embodiment of the present invention, there is provided a communication control method to be implemented in a data communication device. The communication control method includes the steps of:

causing a communication execution unit to execute serial communication of an asynchronous type;

causing a bit variance detection block to detect a variance between bits in communication data which the communication execution unit receives from a remote communicating party;

causing a timer to measure a low-level pulse width which is a low-level pulse duration and is determined with the position of the variance between bits detected by the bit variance detection block; and causing a control unit to execute transmission speed recognizing processing for the communication data according to the low-level pulse width measured by the timer, and to change communication modes according to the result of the recognition.

The step of causing the control unit to execute transmission speed recognizing processing is a step of recognizing the transmission speed for the communication data as a low speed on the basis of the confirmation that the low-level pulse width is a low-level pulse width equivalent to a bit width compatible with low-speed communication data.

According to still another embodiment of the present invention, there is provided a program causing a data communication device to execute communication control processing. The program includes the steps of:

causing a communication execution unit to execute serial communication of an asynchronous type;

causing a bit variance detection block to detect a variance between bits in communication data which the communication execution unit receives from a remote communicating party;

causing a timer to measure a low-level pulse width which is a low-level pulse duration and is determined with the position of the variance between bits detected by the bit variance detection block; and causing a control unit to execute transmission speed recognizing processing for the communication data according to the low-level pulse width measured by the timer, and to change communication modes on the basis of the result of the recognition.

The step of causing the control unit to execute transmission speed recognizing processing is a step of recognizing the transmission speed for the communication data as a low speed on the basis of the confirmation that the low-level pulse width is a low-level pulse width equivalent to a bit width compatible with low-speed communication data.

The program in accordance with the embodiment of the present invention is a program that can be supplied to a general-purpose system, which can run various programs or codes, by means of a recording medium or a communication medium that supplies the program in a computer-readable form. When the program is supplied in the computer-readable form, pieces of processing described in the program are implemented in a computer system.

The constituent feature and advantage of the present invention will be made apparent from a description to be made in conjunction with the embodiments of the present invention to be described later and appended drawings. What is referred to as a system in this specification is a logical conglomerate of multiple apparatuses and devices but is not limited to an entity having the apparatuses and devices integrated into the same housing.

According to the embodiment of the present invention, in a communication device that executes serial communication of an asynchronous type, a variance between bits in communication data received from a remote communicating party is detected, a low-level pulse width that is a low-level pulse duration is measured, and whether the communication data is high-speed communication data or low-speed communication data is decided based on a decision made on whether the measured low-level pulse width is a low-level pulse width equivalent to a bit width compatible with low-speed communication data. Owing to this constitution, the transmission speed for communication data sent from the remote communicating party whose transmission speed is unknown can be detected. Control can be implemented so that communication will be established by changing transmission speeds to designate the same transmission speed as a transmission speed employed in the remote communicating party.

BRIEF DESCRIPTION OF THE DRAWINGS

FIG. 2 is a diagram showing an example of the configuration of a data communication system utilizing a data communication device to which the present invention is applied;

FIGS. 3A and 3B are diagrams showing an example of communication data for serial communication to be executed between a communicating section b 200 and a communicating section a1 110 or a communicating section a2 120 which are shown in FIG. 2;

FIG. 4 is a diagram for use in explaining an example of the configuration of a data communication device in accordance with an embodiment of the present invention;

FIGS. 5A and 5B are diagrams for use in explaining an example of transmission speed recognizing processing 1 to be executed by the data communication device;

FIGS. 6A and 6B are diagrams for use in explaining an example of transmission speed recognizing processing 2 to be executed by the data communication device;

FIGS. 7A and 7B are diagrams for use in explaining a concrete example of serial data communicating processing to be executed with four words regarded as one frame, and an example of pieces of processing to be performed in response to a command;

FIGS. 8A to 8D are diagrams for use in explaining a concrete example of communicating processing to be performed by the data communication device in accordance with the embodiment of the present invention;

FIGS. 9A to 9D are diagrams for use in explaining a concrete example of communicating processing to be performed by the data communication device in accordance with the embodiment of the present invention;

FIGS. 10A, 10B, and 10C are diagrams for use in explaining a concrete example of communicating processing to be performed by the data communication device in accordance with the embodiment of the present invention;

FIG. 11 is a diagram for use in explaining a processing sequence to be followed by the data communication device according to the embodiment of the present invention;

FIG. 12 is a diagram showing a flowchart describing a processing sequence to be followed by the data communication device according to the embodiment of the present invention;

DESCRIPTION OF THE PREFERRED EMBODIMENTS

Figure 1A:
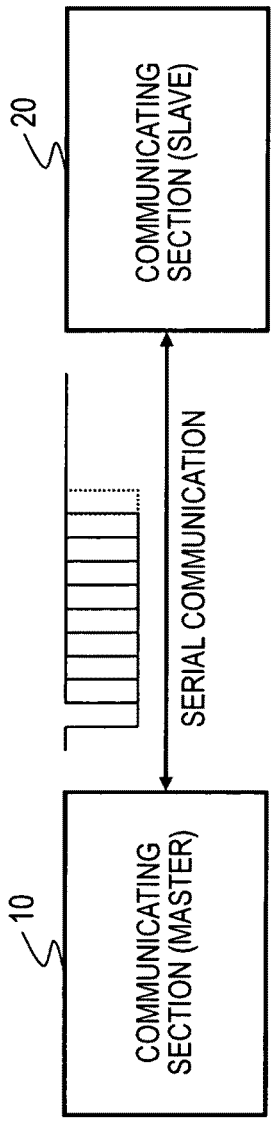
FIGS. 1A and 1B are diagrams for use in explaining the outline of serial data communication conformable to an asynchronous method.
Figure 1B:
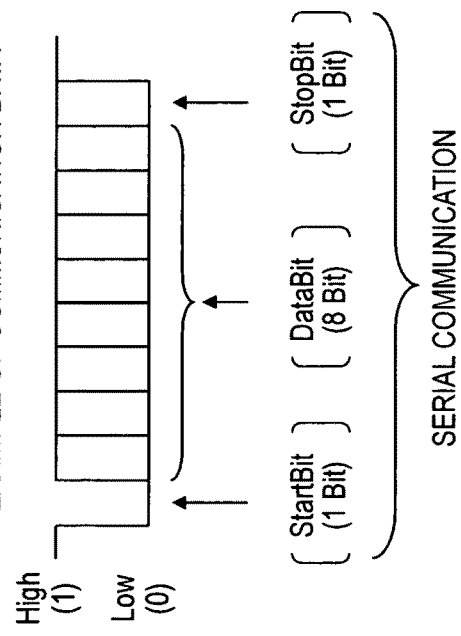

Referring to the drawings, a data communication device in accordance with an embodiment of the present invention, a communication control method, and a program will be described below. A description will be made by sequentially taking up items listed below.

(1) Examples of configurations of a data communication system and a data communication device (2) Example of transmission speed recognizing processing 1 to be executed by the data communication device (3) Example of transmission speed recognizing processing 2 to be executed by the data communication device (4) Concrete example of communicating processing (5) Details of processing to be performed by the data communication device (6) Processing sequence to be followed by the data communication device (1) Examples of Configurations of a Data Communication System and a Data Communication Device To begin with, a data communication system to which the present invention can be adapted will be outlined below. A data communication device in accordance with an embodiment of the present invention performs serial communication of an asynchronous type. Further, the data communication device is configured to treat communication data items to be transmitted at different transmission speeds.

FIG. 2 shows an example of the configuration of the data communication system utilizing the data communication device in accordance with the embodiment of the present invention. In FIG. 2, the data communication device in accordance with the embodiment of the present invention is shown as a communicating section b (slave) 200. The communicating section b 200 performs serial communication of an asynchronous type to communicate with a communicating section a1 (master) 110 or a communicating section a2 (master) 120.

The communicating section b (slave) 200 communicates with the communicating section a1 (master) 110 at a transmission speed A, for example, a high (8192 bps) transmission speed. The communicating section b (slave) 200 communicates with the communicating section a2 (master) 120 at a transmission speed B, for example, a low (2048 bps) transmission speed.

The communicating sections are realized with, for example, a main body of an information processing system or a battery. More particularly, the communicating section a1 (master) 110 and communicating section a2 (master) 120 are camera bodies of different cameras including a video camera and a still camera, while the communicating section b (slave) 200 is a battery to be attached to the camera body.

The communicating section b (slave) 200 that is a battery includes a CPU and a memory, communicates with the communicating section a1 (master) 110 or communicating section a2 (master) 120 that is a camera body, stores information, for example, a model name of a camera in a memory included in the battery, and reads or writes record data from or in the memory in response to a request sent from the camera body. The battery and camera body perform transmit or receive commands including a data writing request and a data reading request, data to be written, and read data through serial communication. Each of the communicating section a1 (master) 110 and communicating section a2 (master) 120 includes a control unit that is realized with a CPU and others and that controls communication.

The communicating section b (slave) 200 that is a battery may be attached to any of various cameras. As shown in FIG. 2, the communicating section b 200 may be attached to, for example, the communicating section (host) 110 serving as a camera body that has the capability to execute serial communication at the transmission speed A (8192 bps), or the communicating section (host) 120 serving as a camera body that has the capability to execute serial communication at the transmission speed B (2048 bps).

The communicating section b 200 is requested to communicate with the communicating sections that perform serial communication at the different transmission speeds.

Therefore, the communicating section b (slave) 200 is requested to receive serial communication data items at different transmission speeds and interpret them. Further, the communicating section b (slave) 200 is requested to be able to transmit the serial communication data items at the different transmission speeds.

The communicating section b (slave) 200 analyzes the transmission speed of communication to be executed by the communicating section (host) connected to the communicating section b (slave) 200, transmits data at a transmission speed corresponding to the transmission speed, and analyzes received data. Namely, the communicating section b (slave) 200 has an autonomous transmission speed switching capability.

As described previously, a transmission speed in serial data communication is often expressed with a baud rate defined as the number of bits per second (bps). A data transmitting side and a data receiving side are requested to perform processing at the same baud rate. The communicating section b (slave) 200 analyzes the baud rate of communication executed by the communicating section (host) connected to the communicating section b (slave) 200, acquires received data at the baud rate, interprets the data, and transmits data at the baud rate.

FIGS. 3A and 3B show an example of communication data for serial communication to be executed between the communicating section b 200 and the communicating section a1 110 or communicating section a2 120. The communicating section b 200 performs serial communication of an asynchronous type. FIG. 3A shows an example of communication data, and FIG. 3B shows an example of a word structure.

In serial communication of an asynchronous type, as described previously, data that is an object of transmission is sandwiched between a start bit and a stop bit, and then transmitted. For example, communication data composed of a start bit of 1 bit long, data of 8 bits long, and a stop bit of 1 bit long shall be called a word (one word). A data transmitting side produces data in units of the word, and outputs the data to a receiving side. As shown in FIG. 3A, multiple words (in the drawing, four words of words 0 to 3) constitute a frame (one frame). The frame is a unit for communication.

In general, in single-line serial communication, whichever of the communicating section a (master) and the communicating section b (slave) outputs data is determined. However, since one word contains data of 8 bits (1 byte) long, kinds of data items to be expressed using one word are $2^8=256$ patterns. When a simple command or data is transmitted or received, communication is achieved using one word. However, a sophisticated system will find the number of data items to be expressed insufficient.

Therefore, a frame including multiple words is specified as a unit for communication, and intercommunication is performed in units of the frame. Thus, the number of data items to be expressed can be increased. Incidentally, the position of the beginning of a frame is identified by detecting the position of generation of the first low-level pulse succeeding a high-level pulse spacing which is a certain time interval and during which a low-level pulse is not generated. The first low-level pulse of the frame corresponds to a start bit in a leading word of the frame.

Referring to FIG. 4, an example of the configuration of the data communication device in accordance with the embodiment of the present invention will be described below. The configuration of the data communication device shown in FIG. 4 corresponds to the internal configuration of the communicating section b (slave) 200 shown in FIG. 2. Namely, the data communication device is a communication device having a transmission speed switching capability.

The communicating section b 200 includes, as shown in FIG. 4, a communication execution unit 210, an interrupt processing unit 220, a timer 230, a control unit (CPU) 240, and a CPU bus 250.

The communication execution unit 210 includes an output block 211, an input block 212, and a transmission speed designation block 213. The output block 211 outputs serial communication data to a remote communicating party (in this example, a communicating section (host)), and the input block 212 inputs serial communication data sent from the remote communicating party. Incidentally, the communication data includes, as described previously with reference to FIGS. 3A and 3B, a word composed of a start bit, data, and a stop bit. The communication data is outputted or inputted in units of a frame. The transmission speed designation block 213 designates a transmission speed corresponding to the transmission speed employed in the remote communicating party. The communication execution unit 210 is realized with a serial interface, for example, a universal asynchronous receiver transmitter (UART). The communication execution unit 210 may be configured to have the programmed input/output (PIO) method implemented therein.

The interrupt processing unit 220 includes a bit variance detection block 221 that inputs data transmitted from a remote communicating party and detects a point in the data at which bits (representing a high or low level) vary from each other.

The timer 230 includes a time measurement block 231 that measures a time in response to an instruction sent from the control unit 240.

The control unit 240 has a CPU serving as a program execution block, performs processing according to a program stored in a memory that is not shown, and controls pieces of processing to be performed by the communication execution unit 210, interrupt control unit 220, and timer 230. The control unit 240 includes a transmission speed calculation block 241 and executes the processing of calculating a transmission speed for data inputted from the remote communicating party.

The CPU bus 250 is a bus over which data or commands are transferred among the communication execution unit 210, interrupt processing unit 220, timer 230, and control unit 240.

Alphabets A to N in the drawing denote signals carrying data or a command and being inputted or outputted to or from the components. The signals A to N will be described below.

The signal A is a signal carrying serial output data, and is produced by the control unit 240, inputted to the communication execution unit 210, and outputted to outside via the output block 211.

The signal B is a signal carrying serial input data that is serial communication data inputted from a remote communicating party, and is inputted to the control unit 240 via the input block 212.

The signal C carries information on a transmission speed calculated by the transmission speed calculation block 241 included in the control unit 240, that is, a transmission speed which is calculated by analyzing serial communication data inputted from a remote communicating party and which is adopted by the remote communicating party. The information on a transmission speed is fed to the transmission speed designation block 213 included in the communication execution unit 210. The transmission speed designation block 213 configures the communication execution unit 210 so that serial communication data will be outputted at the transmission speed corresponding to the transmission speed fed from the control unit 240, and communication data to be inputted will be treated at the transmission speed.

The signal D is a control signal serving as a reference for a transmission speed designated by the control unit 240, and is fed to the output block 211 and input block 212. The output block 211 determines a pulse width for serial communication data to be outputted according to the control signal. The input block 212 analyzes communication data, which is inputted from a remote communicating party, according to the control signal. For example, the input block 212 discriminates a start bit, data, and a stop bit from one another.

The signal E is a signal to be transmitted through serial communication.

The signal F is a signal received through serial communication.

Each of the signals E and F carries communication data containing a word composed of, as described with reference to FIGS. 3A and 3B, a start bit, data, and a stop bit. The communication data may have a frame defined to include one or more words.

The signal G is a signal which the control unit 240 produces according to a program and with which a kind of variance in a signal to be detected by the bit variance detection block 221 included in the interrupt processing unit 220 is determined. More particularly, the signal G is a signal to be used to designate whether the leading edge of a pulse representing a transition from a low level to a high level is detected as a variance between bits or the trailing edge thereof representing a transition from the high level to the low level is detected as the variance between bits. A concrete processing sequence utilizing the control signal will be described later.

The signal H is an interrupt signal to be outputted to the control unit 240 when the bit variance detection block 221 included in the interrupt processing unit 220 detects a variance between bits during serial communication. On receipt of the interrupt signal at the control unit 240, the control unit 240 controls the timer 230 so that the timer 230 will initiate or terminate time measurement.

The signal I is a signal received from a remote communicating party through serial communication. The bit variance detection block 221 included in the interrupt processing unit 220 inputs serial communication data from the remote communicating party, and detects as a variance between bits the leading edge of a pulse which represents a transition from a low level to a high level, or the trailing edge thereof which represents a transition from the high level to the low level.

The signal J is a control signal which is inputted from the control unit 240 to the time measurement block 231 included in the timer 230, and with which initiation or termination of time measurement is instructed.

The signal K carries read data representing a time measured by the time measurement block 231 included in the timer 230, and is read in response to an instruction sent from the control unit 240.

The signal L is a signal to be inputted to the control unit 240 on the basis of the signal H (interrupt signal) outputted from the interrupt processing unit 220 and the signal K outputted from the timer 230 (representing a time measured by the time measurement block 231). The transmission speed calculation block 241 included in the control unit 240 calculates the transmission speed, at which serial communication data is inputted from a remote communicating party, using the pieces of input information.

The signal M is an output signal of the control unit and includes signals M1 to M3 described below.

The signal M1 carries information on a transmission speed calculated by the transmission speed calculation block 241 included in the control unit 240 (equivalent to the input signal C of the communication execution unit 210).

The signal M2 is a signal which the control unit 240 produces based on a program and with which a kind of variance in a signal to be detected by the bit variance detection block 221 included in the interrupt processing unit 220 (a transition from a high level to a low level or a transition from the low level to the high level) is determined (equivalent to the input signal G of the interrupt processing unit 220).

The signal M3 is a control signal which is outputted from the control unit 240 to the time measurement block 231 included in the timer 230, and with which initiation or termination of time measurement is instructed (equivalent to the input signal J of the timer 230).

Incidentally, the signals to be transferred among the components are propagated over the CPU bus 250.

(2) Example of Transmission Speed Recognizing Processing 1 to be Executed by the Data Communication Device Next, referring to FIGS. 5A and 5B, an example of transmission speed recognizing processing 1 to be executed by the data communication device will be described below. Namely, the transmission speed recognizing processing is the transmission speed recognizing processing to be executed in the communicating section b 200. The communicating section b 200 executes analysis of serial communication data inputted from a remote communicating party, and calculates a transmission speed used for the received data.

After the communicating section b 200 calculates the transmission speed used for received data, the communicating section b 200 sets the transmission speed for transmission data to a speed corresponding to the transmission speed used for received data. For analysis of transmission data inputted from a remote communicating party, the communicating section b 200 discriminates a start bit and data from each other on the basis of a bit width compatible with the transmission speed, and thus performs accurate data acquisition matched with the transmission speed.

The communicating section b 200 is designed to be able to perform communication at any of multiple transmission speeds, and is also designed to execute autonomous speed switching processing so as to analyze a transmission speed, which is used for serial communication data inputted from a remote communicating party, perform processing at the transmission speed, that is, data transmitting processing, and analyze received data.

In this example of processing, transmission speed calculating processing for received data is executed in units of a frame. For example, FIG. 5A shows one frame including four words of words 0 to 3.

With the trailing edge of a pulse representing a start bit 301 in the word 0 (a point of a transition from a high level to a low level) as a reference point, a time elapsing until the leading edge of a pulse to be generated next (a point of a transition from the low level to the high level) is measured.

The bit variance detection block 221 included in the interrupt processing unit 220 shown in FIG. 4 detects a variance between bits in received data which is represented by a fall of a signal or a rise thereof, and transmits detected information to the control unit 240. With the transmission as a trigger, the time measurement block 231 included in the timer 230 performs time measurement under the control of the control unit 240.

FIG. 5B shows an example of transmission speed analysis. One word is composed of a start bit of 1 bit long (0 represented by a low level), data of 8 bits long, and a stop bit of 1 bit long (1 represented by a high level).

By the way, serial communication data inputted from a remote communicating party is either high-speed (8192 bps) communication data or low-speed (2048 bps) communication data to be transmitted at a quarter of the high speed. An example of processing to be described below is an example of processing of recognizing either of transmission speeds. The recognizing processing is performed by the transmission speed calculation block 241 of the control unit 240.

As shown in part B1 Example of Communication Data of FIG. 5B, when serial communication data inputted from a remote communicating party is high-speed (8192 bps) communication data, if data of 8 bits long contained in one word were transmitted at a low speed (2048 bps), a start bit and only one bit of the data can be transmitted.

Data of 8 bits long is often data in which bits of 0s (represented by a low level) or is (represented by a high level) coexist. Therefore, there is a high possibility that the leading edge of a pulse (a variance between bits represented by a transition from the low level to the high level) is generated at any of the positions of the first to eighth bits in a word. In this case, a time to be measured is a time elapsing until generation of the first high-level pulse representing a bit of 1 of the data. There is a possibility that eight kinds of times may be measured. If all of the eight bits of the data are represented by low-level pulses, a time elapsing until generation of the leading edge of a pulse representing a stop bit is measured.

Initially, the timer begins measurement on the assumption that data inputted from a remote communicating party is high-speed (8192 bps) communication data.

Part B2 Low-level Pulse Width (low-level pulse duration) of FIG. 5B shows times measured in a case where each of pulses representing the first to eighth bits of data is the first rising pulse (A to H) on the assumption that input data is high-speed (8192 bps) communication data, a time measured in a case where a pulse representing a stop bit is the first rising pulse (I), and a time measured in a case where the first rising pulse is generated behind the stop bit position of the high-speed (8192 bps) communication data (J).

In the drawing, each of pulse spacings A to I corresponds to one bit width with a point of a change of adjoining bits out of the first to eighth bits of data as a center on the assumption that the data is high-speed (8192 bps) communication data.

Part B3 Results of Recognitions of FIG. 5B shows the results of recognitions made when the times shown in part B2 of FIG. 5B are measured. As each of the results of recognitions, whether the transmission speed used for serial communication data inputted from a remote communicating party is the high speed (8192 bps) or the low speed (2048 bps) is indicated, and a bit configuration based on the result of recognition is indicated. For example, the table for acquiring the result of recognition is stored in the memory of the control unit 240. Specifically, as data to be used to decide whether communication data is high-speed or low-speed communication data, a table in which multiple values of a low-level pulse width are listed in association with either the high speed or low speed is stored. The control unit 240 references the table to execute transmission speed recognizing processing for communication data according to the low-level pulse width measured by the timer.

The results of recognitions in part B3 of FIG. 5B include nine results of recognitions. The results of recognitions are associated with the timer measured times (A to J) in part B2 of FIG. 5B. Specifically, a transmission speed is recognized as described below according to whichever of the times A to J shown in part B2 of FIG. 5B the low-level pulse width (low-level pulse duration) elapsing since the trailing edge of a pulse representing the start bit 301 in a word 0 (a point of a transition from the high level to the low level) corresponds to.

When the low-level pulse width (low-level pulse duration) corresponds to the time A, it applies to a case where a transition is made from the low level to the high level at the first bit position (bit 0) of data in the word of high-speed communication data.

In this case, the transmission speed is recognized as the high speed (8192 bps).

The bit configuration of the data is 1******* where * denotes 0 or 1.

When the low-level pulse width (low-level pulse duration) corresponds to the time B, it applies to a case where a transition is made from the low level to the high level at the second bit position (bit 1) of the data in the word of the high-speed communication data.

In this case, the transmission speed is recognized as the high speed (8192 bps).

The bit configuration of the data is 01******.

When the low-level pulse width (low-level pulse duration) corresponds to the time C, it applies to a case where a transition is made from the low level to the high level at the third bit position (bit 2) of the data in the word of the high-speed communication data.

In this case, the transmission speed is recognized as the high speed (8192 bps).

The bit configuration of the data is 001*****.

When the low-level pulse width (low-level pulse duration) corresponds to the time D, it applies to a case where a transition is made from the low level to the high level at the fourth bit position (bit 3) of the data in the word of the high-speed communication data.

This also applies to a case where a transition is made from the low level to the high level at the first bit position (bit 0) of the data in the word of low-speed communication data.

In this case, the transmission speed is recognized as the low speed (2048 bps).

The bit configuration of the data is 1*******.

When the low-level pulse width (low-level pulse duration) corresponds to the time E, it applies to a case where a transition is made from the low level to the high level at the fifth bit position (bit 4) of the data in the word of the high-speed communication data.

In this case, the transmission speed is recognized as the high speed (8192 bps).

The bit configuration of the data is 00001***.

When the low-level pulse width (low-level pulse duration) corresponds to the time F, it applies to a case where a transition is made from the low level to the high level at the sixth bit position (bit 5) of the data in the word of the high-speed communication data.

In this case, the transmission speed is recognized as the high speed (8192 bps).

The bit configuration of the data is 000001**.

When the low-level pulse width (low-level pulse duration) corresponds to the time G, it applies to a case where a transition is made from the low level to the high level at the seventh bit position (bit 6) of the data in the word of the high-speed communication data.

In this case, the transmission speed is recognized as the high speed (8192 bps).

The bit configuration of the data is 0000001*.

When the low-level pulse width (low-level pulse duration) corresponds to the time H, it applies to a case where a transition is made from the low level to the high level at the eighth bit position (bit 7) of the data in the word of the high-speed communication data.

This also applies to a case where a transition is made from the low level to the high level at the second bit position (bit 1) of the data in the word of low-speed communication data.

In this case, the transmission speed is recognized as the low speed (2048 bps).

The bit configuration of the data is 01******.

When the low-level pulse width (low-level pulse duration) corresponds to the time I, it applies to a case where a transition is made from the low level to the high level at the stop bit position in the word of the high-speed communication data.

In this case, the transmission speed is recognized as the high speed (8192 bps).

The bit configuration of the data is 00000000.

When the low-level pulse width (low-level pulse duration) corresponds to the time J, it applies to a case where no transition is made from the low level to the high level at any of the bit positions ending with the stop bit position in the word of the high-speed communication data.

In this case, the transmission speed is recognized as the low speed (2048 bps).

The bit configuration of the data is unknown.

As mentioned above, when the low-level pulse width (low-level pulse duration) beginning at the trailing edge of a pulse representing the start bit in the first word 0 of a frame (a point of a transition from the high level to the low level) lasts until any of the first to third bit positions (bit 0 to bit 2) in the word of the high-speed (8192 bps) communication data, until any of the fifth to seventh bit positions (bit 4 to bit 6) in the word of the high-speed (8192 bps) communication data, or until the stop bit position in the word of the high-speed (8192 bps) communication data, the transmission speed is recognized as the high speed (8192 bps).

In any other case, the transmission speed is recognized as the low speed (2048 bps). Specifically, when the low-level pulse width (low-level pulse duration) beginning at the trailing edge of a pulse representing the start bit in the first word 0 of the frame (a point of a transition from the high level to the low level) lasts until the fourth bit position (bit 3) in the word of the high-speed (8192 bps) communication data, until the eighth bit position (bit 7) in the word of the high-speed (8192 bps) communication data, or until a position beyond the stop bit position in the word of the high-speed (8192 bps) communication data, the transmission speed is recognized as the low speed (2048 bps).

In order to reliably perform the foregoing processing, two bit patterns of 0001** and 00000001 that may be taken by data in a word shall not be employed in the first word (word 0**) of a frame. Otherwise, data having either of the bit patterns shall be treated as invalid data.

The communicating section b 200 measures the low-level pulse duration beginning at the first trailing edge of a pulse representing a bit in a frame inputted from a remote communicating party, and analyzes the transmission speed used for the communication data. Incidentally, the transmission speed shall be initialized to the high speed (8192 bps). If the transmission speed is recognized as the low speed (2048 bps) through the aforesaid measurement, the communication mode is switched to the low-speed communication mode. Specifically, transmission data is switched to low-speed (2048 bps) transmission data, and analysis of received data is switched to processing associated with the low speed (2048 bps).

In this example of processing, the communicating section b 200 measures the low-level pulse duration beginning with the first trailing edge of a pulse representing a bit in the first word of a frame. If the measured low-level pulse width is a low-level pulse width occurring during high-speed (8192 bps) communication, processing in the high-speed communication mode is carried out, that is, a setting compatible with high-speed (8192 bps) communication is established. If the measured low-level pulse width is a low-level pulse width occurring during low-speed (2048 bps) communication, switching to the low-speed communication mode is carried out, that is, a setting compatible with the low-speed (2048 bps) communication is established.

When it says that the high-speed mode, that is, the setting compatible with the high-speed (8192 bps) communication is established, it means that transmission data is structured as high-speed (8192 bps) communication data, and transmitted. In addition, processing based on a bit width compatible with high-speed (8192 bps) communication data is performed on received data. When it says that the low-speed mode, that is, the setting compatible with low-speed (2048 bps) communication is established, it means that transmission data is structured as low-speed (2048 bps) communication data, and then transmitted. In addition, processing based on a bit width compatible with the low-speed (2048 bps) communication data is performed on received data.

According to the aforesaid related art, that is, the patent document 1 (JP-A-2007-259094) or the patent document 2 (JP-A-2001-168853), the bit width of a start bit of 1 bit long or 2 bits long is measured in order to recognize a transmission speed. In contrast, according to the present invention, a low-level pulse duration beginning with a pulse representing a start bit is measured, and a transmission speed is recognized based on the measured time.

According to the processing described in the patent document 1 or 2, it becomes hard to accurately detect a speed because the last bit included in the start bit may equal the first bit of data. In order to avoid this incident, a value identical to the last bit included in the start bit is not used as the first bit of data, or any other measure has to be taken. In this case, 8-bit data can be utilized as 7-bit data in practice. As a result, among 256 kinds of 8-bit data items, 128 kinds of 8-bit data items, that is, a half of 256 kinds of 8-bit data items is not utilized.

In contrast, according to the constitution of the embodiment of the present invention, as described previously, bit patterns that are not utilized are the two bit patterns of (a) 0001**** and (b) 00000001. A total of sixteen kinds of data items have the bit pattern (a). In the processing to which the present invention is applied, 16+1=17 kinds of 8-bit data items out of 256 kinds of 8-bit data items are not utilized. Thus, when the constitution of the embodiment of the present invention is adopted, a larger number of data structures can be effectively utilized.

(3) Example of Transmission Speed Recognizing Processing 2 to be Executed by the Data Communication Device The example of transmission speed recognizing processing 1 described by referring to FIGS. 5A and 5B is an example of processing in which the first word (word 0) of a frame is a sole object of analysis. However, in the aforesaid example of transmission speed recognizing processing 1, if transmission speed recognizing processing in which the word 0 is regarded as an object of analysis fails, the word 0 of the next frame has to be awaited in order to resume analysis.

For example, if a transmitting side incorrectly transmits data having an inhibited bit pattern, that is, either (a) 0001**** or (b) 00000001, or if analysis fails because of noises occurring on a signal line, the communicating section b 200 that performs transmission speed recognizing processing on the basis of received data may recognize an incorrect transmission speed as a result of recognition.

In this case, the communicating section b 200 switches communication modes from the high-speed (8192 bps) mode to the low-speed (2048 bps) mode. However, since communication data sent from a remote communicating party is actually high-speed (8192 bps) communication data, the communicating section b 200 fails in data analysis, and the data analysis is terminated as an error. After the error occurs, transmission speed recognizing processing is resumed. However, as a result, many communication data items are left as unnecessary data items that are not interpreted. Eventually, processing efficiency is degraded.

An example of processing to be described below is intended to solve the foregoing problem. In the example of processing to be described below, low-level pulse widths (low-level pulse durations) not only in the first word (word 0) of a frame but also in the other words are measured. A transmission speed is recognized based on the results of measurements of the low-level pulse widths (low-level pulse durations) in all the words.

Referring to FIGS. 6A and 6B, the example of processing will be described below. FIG. 6A shows an example of detection of a low-level pulse width in units of a word, and FIG. 6B shows an example of speed detection and switching processing.

In the example of processing, as shown in FIG. 6A, the low-level pulse widths or low-level pulse durations not only in the first word (word 0) of a frame but also in all words constituting the frame are measured.

In the example shown in FIG. 6A, part A1 shows one word forming a data word to be received by the communicating section b 200. Through initialization, processing is performed on the assumption that received data is high-speed (8192 bps) communication data. Part A1 of FIG. 6A shows a start bit and data bits constituting one word to be received through high-speed (8192 bps) communication.

In the example of processing, all low-level pulse widths or all low-level pulse durations generated in the word are measured. As shown in the drawing, assuming that the start bit is 0 represented by a low level and the bit configuration of the data is 11000101, three time intervals (1) to (3) described below are measured as the pulse widths of low-level pulses representing 0s as shown in part A2 of FIG. 6A.

The time interval (1) is measured as the pulse width of the pulse representing the start bit 0.

The time interval (2) is measured as the pulse widths of pulses representing three bits of data in the word on the assumption that the frame is high-speed (8192 bps) communication data.

The time interval (3) is measured as the pulse width of a pulse representing one bit of data in the word on the assumption that the frame is high-speed (8192 bps) communication data.

The bit variance detection block 221 included in the interrupt processing unit 220 shown in FIG. 4 detects a variance between bits such as a rise or a fall of a signal representing received data, transmits detected information to the control unit 240. With the transmission as a trigger, the time measurement block 231 included in the timer 230 measures a time corresponding to a pulse width under the control of the control unit 240.

In this example of processing, the measurement of the low-level pulse width is executed for all words. Whether the received data is high-speed (8192 bps) communication data or low-speed (2048 bps) communication data is decided based on the measured low-level pulse widths. The recognizing processing is performed by the transmission speed calculation block 241 included in the control unit 240. The recognizing processing provides results of recognitions nearly identical to those shown in part B3 of FIG. 5B.

Specifically, when the measured low-level pulse width corresponds to the width of one bit in a word of high-speed (8192 bps) communication data, the widths of one to three bits therein, or the widths of any of five to seven bits therein, the transmission speed is recognized as the high speed (8192 bps).

When the measured low-level pulse width corresponds to the widths of four or eight bits in the word of high-speed (8192 bps) communication data (or the width of one bit in a word of low-speed (2048 bps) communication data or the widths of two bits therein), or corresponds to more widths, the transmission speed is recognized as the low speed (2048 bps).

FIG. 6B shows an example of processing to be performed by the communicating section b 200 in a case where the communicating section b 200 has received one frame data composed of four words of word 0 to word 3.

The communicating section b 200 performs processing by sequentially following steps S11 to S14.

First, at step S11, the word 0 that is a leading word in the frame is regarded as an object of processing and a low-level pulse width is measured.

Assume that data contained in the word 0 has an inhibited pattern of 0001**. The communicating section b 200 performs low-level pulse width measurement similar to the one performed in the example of processing 1** described previously.

The communicating section b 200 measures the low-level pulse width corresponding to four bit widths in a word of high-speed (8192 bps) communication data or one bit width in a word of low-speed (2048 bps) communication data. As a result, based on recognizing processing described in conjunction with FIG. 5B, the received data is recognized as the low-speed (2048 bps) communication data but is not recognized as the high-speed (8192 bps) communication data. At this time, the communicating section changes the setting compatible with high-speed (8192 bps) communication to the setting compatible with low-speed (2048 bps) communication.

At step S12, the communicating section b 200 measures a low-level pulse width of a signal representing a word 1. Herein, as shown in FIG. 6B, three low-level pulse widths, that is, a low-level pulse width corresponding to two bit widths in the word of high-speed (8192 bps) communication data, a low-level pulse width corresponding to one bit width in the word of the high-speed (8192 bps) communication data, and a low-level pulse width corresponding to one bit width in the word of the high-speed (8192 bps) communication data are measured.

The three low-level pulse widths are pulse widths recognized as those compatible with high-speed (8192 bps) communication. The communicating section b 200 changes the setting compatible with low-speed (2048 bps) communication to the setting compatible with high-speed (8192 bps) communication.

At step S13, the communicating section b 200 measures a low-level pulse width of a signal representing a word 2. Herein, as shown in FIG. 6B, a low-level pulse width corresponding to four bit widths in the word of high-speed (8192 bps) communication data (or one bit width in the word of low-speed (2048 bps) communication data is measured. The low-level pulse width is a pulse width recognized to be compatible with low-speed (2048 bps) communication.

In this example of processing, switching from low-speed (2048 bps) communication to high-speed (8192 bps) communication is immediately executed. However, switching from the setting for high-speed (8192 bps) communication to the setting for low-speed (2048 bps) communication is carried out only at the time of measuring a low-level pulse width beginning with a pulse representing the start bit in the word 0.

Therefore, at this time, the setting for high-speed (8192 bps) communication is retained.

At step S14, the communicating section b 200 measures a low-level pulse width of a signal representing a word 3. Herein, as shown in FIG. 6B, a low-level pulse width corresponding to one bit width in the word of high-speed (8192 bps) communication data is measured.

The low-level pulse width is a pulse width recognized to be compatible with high-speed (8192 bps) communication. Since the setting of the communicating section b 200 estab-lished at this time is the setting for high-speed (8192 bps) communication, the communicating section b 200 sustains the setting compatible with high-speed (8192 bps) communication. If the setting compatible with low-speed (2048 bps) communication is established at that time, the setting is immediately changed to the setting compatible with high-speed (8192 bps) communication.

As mentioned above, in this example of processing, low-level pulse widths in all words are measured. If any of the measured low-level pulse widths in the words is a low-level pulse width generated only during high-speed (8192 bps) communication, the communicating section b 200 immediately switches the current mode to the high-speed mode, that is, switches the current setting to the setting compatible with high-speed (8192 bps) communication. More particularly, transmission data is structured as high-speed (8192 bps) communication data, and then transmitted. Received data is treated based on a bit width compatible with the high-speed (8192 bps) communication data.

Accordingly, even when high-speed communication is incorrectly recognized as low-speed communication, if the settings are changed, the setting for high-speed communication can be immediately restored. More particularly, for example, when a data transmitting side transmits data, which has an inhibited pattern, by mistake, or when an error occurs due to noises or the like during received-data analyzing processing, if low-speed communication data is incorrectly identified, the setting can be immediately returned to the setting compatible with high-speed communication data.

Even in the example of processing 2, similarly to the example of processing 1, data having either of the patterns 0001** and 00000001 shall not be employed in the first word (word 0**) of a frame. Otherwise, the data is treated as invalid data. The employment of the data in the second word or subsequent word of the frame may be permitted. In other words, no restrictions may be imposed on data.

Assuming that no restrictions are imposed on data items in words 1 to 3, if a start bit S is 0, a word structure capable of being interpreted as either high-speed (8192 bps) communication data or low-speed (2048 bps) communication data falls into three patterns of S00011111, S00000001, and S00010000.

If any of the patterns, that is, bit configurations is generated in any of words 1 to 3, the communicating section b 200 recognizes the frame as low-speed communication data. Through this recognition alone, the setting of the communicating section will not be changed from the high-speed communication mode to the low-speed communication mode. In this example of processing, the processing of changing the communication modes from the high-speed communication mode to the low-speed communication mode is limited to a case where the processing has to be performed based on a result of measurement of a leading low-level pulse width of a signal representing the first word of a frame.

Specifically, when the leading low-level pulse width of a signal representing the first word of the next frame is measured, only if the low-level pulse width is recognized as a low-level pulse width compatible with low-speed communication by referencing the results of recognitions shown in part B3 of FIG. 5B, the high-speed communication mode is changed to the low-speed communication mode. However, even in the example of processing 2, similarly to the example of processing 1, data having either of the patterns 0001** and 00000001 is not employed in the first word (word 0**) of a frame. When the frame is high-speed communication, unless data having the inhibited pattern is transmitted or incorrectly recognized, there is no possibility that low-speed communication data is recognized.

As mentioned above, in this example of processing, changing the low-speed communication mode to the high-speed communication mode is immediately performed based on detected information on a word included in a frame. However, changing the high-speed mode to the low-speed mode is carried out based on a result of measurement of a leading low-level pulse width of a signal representing the first word of a frame. Owing to the processing, even when data in the first word of one frame is incorrectly interpreted as low-speed communication data, if the low-speed communication mode is incorrectly designated, the low-speed communication mode may be returned to the high-speed communication mode on the basis of a result of measurement of a low-level pulse width of a signal representing a subsequent word of the same frame. As the next and subsequent frames, valid data items can be transmitted or received in the high-speed communication mode.

(4) Concrete Example of Communicating Processing

Next, a concrete example of serial data communicating processing to be performed on the assumption that four words constitute one frame will be described below.

FIGS. 7A and 7B show a concrete example of serial data communicating processing to be performed on the assumption that four words constitute one frame. FIG. 7A is an explanatory diagram showing an example of a frame structure, and FIG. 7B is an explanatory diagram showing an example of processing to be performed on a command.

As shown in FIG. 7A, words 0 to 3 constituting one frame are defined as described below.

The word 0 is a word whose data signifies a control method (command), the word 1 is a word whose data signifies a control item, the word 2 is a word whose data signifies the contents of control, and the word 3 is a word whose data signifies a result of control.

Further, three kinds of commands are specified in the word 0. Namely, a command 00H signifies that no processing should be performed (a communicating system should be reset), a command 10H signifies that control data should be transmitted from the communicating section a (master) to the communicating section b (slave), and a command 20H signifies that control data should be transmitted from the communicating section b (slave) to the communicating section a (master). Herein, H denotes a hexadecimal numeral. 00H stands for 00000000, and hhH stands for 11111111.

FIG. 7B shows processing to be performed on the side of the communicating section b having received a frame containing any of the commands.

When the communicating section b normally receives the command 10H or 20H other than the command 00H, autonomous switching of transmission speeds is inhibited. Specifically, recognizing a transmission speed through measurement of a pulse width described by taking the example of processing 1 or 2 is suspended, and switching communication modes on the basis of a result of recognition is inhibited.

In reality, the communicating section a performs either low-speed (2048 bps) communication or high-speed (8192 bps) communication. If the communicating section b normally receives a command, it means that data transmission/reception in the communication mode adopted in common by the communicating sections is established. Therefore, autonomous switching of transmission speeds is unnecessary until the communicating sections a and b are disconnected from each other. A transmission speed need be fixed.

Therefore, when the communicating section b normally receives the defined command 10H or 20H, autonomous switching of transmission speeds is inhibited.

When the other command is normally received or when any command is not normally received, autonomous switching of transmission speeds is permitted. Specifically, as described in relation to the example of processing 1 or 2, a pulse width is measured, a transmission speed is recognized, and switching of communication modes is executed based on the result of the recognition.

If the communicating section a intentionally switches transmission speeds, the communicating section a transmits the command 00H to the communicating section b. In response to the processing, the communicating section b lifts inhibition of autonomous switching of transmission speeds. Accordingly, autonomous switching of transmission speeds on the side of the communicating section b is permitted. Thereafter, the communicating section a performs communication at a newly adopted transmission speed.

The communicating section b measures a pulse width as described in relation to the example of processing 1 or 2, recognizes a transmission speed, and executes switching of communication modes on the basis of the result of the recognition. Through the processing, communication at the newly adopted transmission speed is established between the communicating sections a and b.

As shown in FIG. 7B, in case of abnormal reception, that is, when the communicating section b fails to normally receive communication data, autonomous switching of transmission speeds is permitted. Even in this case, measurement of a pulse width described in relation to the example of processing 1 or 2 is executed in order to recognize a transmission speed, and switching processing of communication modes is executed based on the result of the recognition.

In consideration of the processing of replacing the communicating section a with another, for example, the processing of disconnecting the communicating section b 200 from the communicating section a1 110 shown in FIG. 2 and connecting the communicating section b 200 to the communicating section a2 120, or its reverse processing, if the communicating section b 200 detects the fact that communication is not performed for a preset certain time, the communicating section b 200 autonomously performs the same processing as that signified by the command 00H.

Specifically, even when autonomous switching of transmission speeds to be performed by the communicating section b is inhibited, if the communicating section b detects the fact that communication will not be performed for a present certain time, the inhibition is lifted in order to permit autonomous switching of transmission speeds. Eventually, a new transmission speed at which communication data is transmitted from the new communicating section a is recognized. Thus, switching of different communicating sections a that perform communication at different transmission speeds can be coped with.

Even in a state in which autonomous switching of transmission speeds is inhibited, if the communicating section b receives communication data at a speed different from a transmission speed to which the communicating section b is set, abnormal communication occurs. In this case, inhibition of autonomous switching of transmission speeds is lifted. A pulse width is measured as described in relation to the example of processing 1 or 2 in order to recognize a transmission speed. Switching processing of communication modes based on the result of the recognition is executed.

FIG. 8A to FIG. 10C show concrete examples of communicating processing.

FIGS. 8A to 8D show four examples of processing. Namely, FIG. 8A shows an example of communicating processing to be performed with a communication mode fixed in the high-speed (8192 bps) communication mode. FIG. 8B shows an example of communicating processing to be performed with the communication mode fixed in the low-speed (2048 bps) communication mode. FIG. 8C shows an example of processing in which the communicating section a outputs the command 00H to the communicating section b so that high-speed (8192 bps) communication will be switched to low-speed (2048 bps) communication. FIG. 8D shows an example of processing in which when the communicating section b has its autonomous switching of transmission speeds inhibited, the transmission speeds are switched by reason of abnormal reception.

To begin with, the example of communicating processing to be performed as shown in FIG. 8A with a communication mode fixed in the high-speed (8192 bps) communication mode will be described below. As described previously, the communicating section b is initialized to operate in the high-speed (8192 bps) communication mode. Therefore, when the communicating section b receives high-speed (8192 bps) communication data from the communicating section a, the communicating section b analyzes the received data in the high-speed (8192 bps) communication mode. In this case, the received data contained in the leading frame can be correctly analyzed. Eventually, normal reception is achieved.

Although the communicating section b is initially permitted to autonomously switch transmission speeds, once the communicating section b normally receives the command 10H or 20H, the communicating section b has the autonomous switching of the transmission speeds inhibited. Thereafter, processing in the high-speed (8192 bps) communication mode is continued.

Next, the example of communicating processing to be performed as shown in FIG. 8B with a communication mode fixed in the low-speed (2048 bps) communication mode will be described below. The communicating section b is initialized to operate in the high-speed (8192 bps) communication mode. The communicating section b is initially permitted to autonomously switch transmission speeds. When the communicating section b receives low-speed (2048 bps) communication data from the communicating section a, the communicating section measures a pulse width of a signal representing the first frame in the same manner as that described in the example of processing 1 or 2, and thus recognizes a transmission speed.

In this case, the first received frame 411 is subjected to transmission speed recognizing processing. Communication data is not acquired, or in other words, the frame is not used as valid communication data. However, the second and subsequent frames 412 are frames to be treated with the transmission speeds switched based on a result of recognition, and the frames can be used as valid communication data items.

Next, the example of processing to be performed as shown in FIG. 8C in order to switch high-speed (8192 bps) communication and low-speed (2048 bps) communication by outputting the command 00H from the communicating section a to the communicating section b will be described below.

The communicating section a transmits frames 421 and 422 in the high-speed (8192 bps) communication mode, and transmits the command 00H within the frame 422. The communicating section b having received the command 00H changes an autonomous transmission-speed switching inhibited mode to a permitted mode.

Thereafter, the communicating section a switches transmission speeds and transmits a frame 423 and subsequent frames through low-speed (2048 bps) communication. The communicating section b measures a pulse width of a signal representing the first frame 423, which is outputted from the communicating section a through low-speed (2048 bps) communication, in the same manner as that described in the example of processing 1 or 2, and thus recognizes a transmission speed. Through the recognizing processing, the communicating section b recognizes low-speed (2048 bps) communication, and switches communication modes from the high-speed communication mode to the low-speed (2048 bps) communication mode.

In this case, the frame 423 received first after high-speed communication is switched to low-speed (2048 bps) communication is subjected to transmission speed recognizing processing. Communication data is not acquired, or in other words, the frame 423 is not used as valid communication data. However, the second frame 424 and subsequent frame 425 are frames to be treated with transmission speeds switched based on a result of recognition, and the frames are used as valid communication data items.

Further, the communicating section a transmits the command 00H within the frame 425. The communicating section b having received the command 00H changes an autonomous transmission-speed switching inhibited mode to a permitted mode. The communicating section a switches transmission speeds and transmits the frame 426 and subsequent frames through high-speed (8192 bps) communication.

The communicating section b measures a pulse width of a signal representing the first frame 426, which is outputted from the communicating section a through high-speed (8192 bps) communication, in the same manner as that described in the example of processing 1 or 2, and thus recognizes a transmission speed. Through the recognizing processing, the communicating section b recognizes high-speed (8192 bps) communication, and switches the communication modes from the low-speed communication mode to the high-speed (8192 bps) communication mode.

In this case, the frame 426 received first after low-speed communication is switched to high-speed (8192 bps) communication is subjected to transmission speed recognizing processing. Therefore, communication data is not acquired, or in other words, the frame 426 is not used as valid communication data. However, the subsequent frames 427 and 428 are frames to be treated with the transmission speeds switched based on a result of recognition, and the frames are used as valid communication data items.

Next, the example of processing to be performed as shown in FIG. 8D in order to switch transmission speeds by reason of abnormal reception with the communicating section b placed in a transmission-speed switching inhibited state will be described below.

A frame 431 is a high-speed (8192 bps) communication frame. Since the communicating section b is initialized to perform high-speed (8192 bps) communication, the communicating section b can treat the frame. Thereafter, the communicating section a abruptly switches transmission speeds without transmitting the command 00, and transmits frames 432 to 434 in the low-speed (2048 bps) communication mode.

At the time point when the communicating section b has received the frame 431, the communicating section b is placed in a normally receiving state, and has its autonomous switching of transmission speeds inhibited. However, thereafter, at the time point when the communicating section b receives a low-speed (2048 bps) frame 432, the communicating section b is placed in the high-speed (8192 bps) communication mode and fails to analyze the frame 432. Therefore, the communicating section b acknowledges abnormal reception. At this time point, the communicating section b changes its states from the autonomous transmission-speed switching inhibited state to the permitted state. Thereafter, the frame 433 is used to measure a pulse width in the same manner as that described in the example of processing 1 or 2. Through the recognizing processing, the communicating section b recognizes the low speed (2048 bps) and switches the communication mode to the low-speed (2048 bps) communication mode.

In this case, the frame 432 received first after the communicating section a switches high-speed communication to low-speed (2048 bps) communication is regarded as a result of abnormal reception. The next frame 433 is subjected to transmission speed recognizing processing. Therefore, communication data is not acquired, or in other words, the frame is not used as valid communication data. However, the subsequent frame 434 is a frame to be treated with the transmission speeds switched based on the result of recognition, and the frame 434 is used as valid communication data.

Further, the communicating section a abruptly switches transmission speeds without transmitting the command 00, and transmits frames 435 to 437 in the high-speed (8192 bps) communication mode.

At the time point when the communicating section b has received the frame 434, the communicating section b is placed in the normally receiving state and in the autonomous transmission-speed switching inhibited state. However, at the time point when the communicating section b receives the high-speed (8192 bps) frame 435, since the communicating section b operates in the low-speed (2048 bps) communication mode, the communicating section b fails to analyze the frame 435. Therefore, the communicating section b acknowledges abnormal reception. At this time point, the communicating section b changes the states thereof from the autonomous transmission-speed switching inhibited state to the permitted state. Thereafter, the communicating section b uses the frame 436 to measure a pulse width in the same manner as that described in the example of processing 1 or 2. Through the recognizing processing, the communicating section b recognizes the high speed (8192 bps) and switches the communication modes from the low-speed communication mode to the high-speed (8192 bps) communication mode.

In this case, the frame 435 received first after the communicating section a switches low-speed communication to high-speed (8192 bps) communication is regarded as a result of abnormal reception. The next frame 436 is subjected to transmission speed recognizing processing. Communication data is not acquired, or in other words, the frame is not used as valid communication data. However, the subsequent frame 437 is used as a frame to be processed with the transmission speeds switched based on the result of recognition, and the frame 437 is used as valid communication data.

Next, referring to FIGS. 9A to 9D, examples of processing to be performed when a communication suspended period is equal to or longer than a preset threshold time will be described below. As described previously, when the communication suspended period is equal to or longer than the preset threshold time, if autonomous switching of transmission speeds is inhibited, the communicating section b performs processing of changing the states from the inhibited state to the permitted state. When the communication suspended period is equal to or longer than the preset threshold time, the communicating section is initialized. In the initial state, the communicating section b is placed in the high-speed (8192 bps) communication mode and in the autonomous transmission-speed switching permitted state.

A mark 451 shown in FIGS. 9A to 9D indicates elapse of a time equal to or longer than the threshold time. If the communicating section b is placed in the autonomous transmission-speed switching inhibited state at the time point indicated with the mark 451, the communicating section b performs the processing of changing the states from the inhibited state to the permitted state.

FIGS. 9A to 9D show four examples of processing that are examples in each of which the communication suspended state equal to or longer than the threshold time is attained.

FIG. 9A shows an example of communicating processing to be performed with the communication mode fixed in the high-speed (8192 bps) communication mode, FIG. 9B shows an example of communicating processing to be performed with the communication mode fixed in the low-speed (2048 bps) communication mode, FIG. 9C shows an example of processing of switching the communication modes from the low-speed (2048 bps) communication mode to the high-speed (8192 bps) communication mode, and FIG. 9D shows an example of processing of switching the communication modes from the high-speed (8192 bps) communication mode to the low-speed (2048 bps) communication mode.

To begin with, the example of communicating processing to be performed as shown in FIG. 9A with the communication mode fixed in the high-speed (8192 bps) communication mode will be described below. As described previously, the communicating section b is initialized to operate in the high-speed (8192 bps) communication mode. Therefore, when the communicating section b receives high-speed (8192 bps) communication data from the communicating section a, the communicating section analyzes the received data in the high-speed (8192 bps) communication mode. In this case, the received data contained in the leading frame can be correctly analyzed, and normal reception is achieved.

When the communication suspended period elapses by a time equal to or longer than the preset threshold time, the communicating section b changes to the initial state. The initial state is defined as a state in which the communicating section b is placed in the high-speed (8192 bps) communication mode and in the autonomous transmission speed switching permitted state. Therefore, after the threshold time elapses as indicated with the mark 451 in FIG. 9A, the communicating section b is set to the initial state, that is, is placed in the high-speed (8192 bps) communication mode. Therefore, the communicating section b placed in the high-speed (8192 bps) communication mode correctly receives high-speed (8192 bps) communication data.

Next, the example of communicating processing to be performed as shown in FIG. 9B with the communication mode fixed in the low-speed (2048 bps) communication mode will be described below. The communicating section b is initialized to operate in the high-speed (8192 bps) communication mode. The communicating section b is, in the initial state, permitted to autonomously switch transmission speeds. Therefore, when the communicating section b receives low-speed (2048 bps) communication data from the communicating section a, the communicating section b measures a pulse width of a signal representing the first frame 461 in the same manner as that described in the example of processing 1 or 2, and thus recognizes a transmission speed.

In this case, the first frame 461 to be received is subjected to transmission speed recognizing processing. Communication data is not acquired, or in other words, the frame 461 is not used as valid communication data. However, the second and subsequent frames 462 are used as frames to be treated with the transmission speeds switched based on the result of recognition, and the frames are used as valid communication data items.

Thereafter, when the communication suspended period equal to or larger than the preset threshold time elapses as indicated with the mark 451, the communicating section b changes to the initial state. The initial state is defined as a state in which the communicating section b is placed in the high-speed (8192 bps) communication mode and in the autonomous transmission-speed switching permitted state. Therefore, after the threshold period elapses as indicated with the mark 451 in FIG. 9B, the communicating section b is set to the initial state, that is, is placed in the high-speed (8192 bps) communication mode and in the autonomous transmission speed switching permitted state.

Now, a frame 463 to be received first as low-speed (2048 bps) communication data is used to recognize a transmission speed. A pulse width is measured in the same manner as that described in the example of processing 1 or 2 in order to recognize a transmission speed. Through the recognizing processing, low-speed (2048 bps) communication is acknowledged, and the communication modes are switched from the high-speed communication mode to the low-speed (2048 bps) communication mode.

In this case, the frame 463 received first after the elapse of the certain time is subjected to transmission speed recognizing processing. Communication data is not acquired, or in other words, the frame is not used as valid communication data. However, the second and subsequent frames 464 and 465 are frames to be treated with the transmission speeds switched based on the result of recognition, and are used as valid communication data items.

Next, the example of processing which is shown in FIG. 9C and is performed to switch from low-speed (2048 bps) communication to high-speed (8192 bps) communication will be described below.

A low-speed (2048 bps) communication frame 471 which the communicating section b first receives in the initial state is a frame which the communicating section b uses to recognize a transmission speed. A pulse width is measured in the same manner as that described in the example of processing 1 or 2 in order to recognize the transmission speed. Through the recognizing processing, low-speed (2048 bps) communication is acknowledged, and the communication modes are switched from the high-speed communication mode to the low-speed (2048 bps) communication mode. A frame 472 is normally received.

When the communication suspended period equal to or longer than the preset threshold time elapses as indicated with the mark 451, the communicating section b changes to the initial state. The initial state is defined as a state in which the communicating section b is placed in the high-speed (8192 bps) communication mode and in the autonomous transmission-speed switching permitted state. Therefore, after the threshold time elapses as indicated with the mark 451 in FIG. 9C, the communicating section b is set to the initial state, that is, is placed in the high-speed (8192 bps) communication mode and in the autonomous transmission-speed switching permitted state.

Thereafter, frames 473 to 475 sent from the communicating section a in the high-speed (8192 bps) communication mode are normally received by the communicating section b.

Next, the example of processing to be performed as shown in FIG. 9D in order to switch the communication modes from the high-speed (8192 bps) communication mode to the low-speed (2048 bps) communication mode will be described below.

High-speed (8192 bps) communication frames 481 and 482 are normally received by the communicating section b in the initial state (high-speed communication mode).

When the communication suspended period equal to or longer than the present threshold time elapses as indicated with the mark 451, the communicating section b changes to the initial state. The initial state is defined as a state in which the communicating section b is placed in the high-speed (8192 bps) communication mode and in the autonomous transmission-speed switching permitted state. Thereafter, after the threshold time elapses as indicated with the mark 451 in FIG. 9D, the communicating section b is set to the initial state, that is, is placed in the high-speed (8192 bps) communication mode and in the autonomous transmission-speed switching permitted state.

A frame 483 that is low-speed (2048 bps) communication data to be received first is a frame to be used to recognize a transmission speed. A pulse width is measured in the same manner as that described in the example of processing 1 or 2 in order to recognize the transmission speed. Through the recognizing processing, low-speed (2048 bps) communication is acknowledged, and the communication modes are switched from the high-speed communication mode to the low-speed (2048 bps) communication mode.

In this case, the frame 483 received first after the elapse of the certain period of time is subjected to transmission speed recognizing processing. Therefore, communication data is not acquired, or in other words, the frame is not used as valid communication data. However, the second frame 484 and subsequent frames are frames to be treated with the transmission speeds switched based on the result of recognition, and the frames are used as valid communication data items.

FIG. 8A to FIG. 9D show the examples of processing to be performed on the assumption that four words constitute one frame. Referring to FIGS. 10A to 10C, examples of processing to be performed on the assumption that one word forms one word will be described below.

FIGS. 10A to 10C show three examples of processing to be performed on the assumption that one frame is formed with one word.

FIG. 10A shows an example of communicating processing to be performed with a communication mode fixed in the low-speed (2048 bps) communication mode. FIG. 10B shows an example of processing to be performed in order to switch the low-speed (2048 bps) and high-speed (8192 bps) communication modes in response to a command. FIG. 10C shows an example of processing to be performed in order to switch the low-speed (2048 bps) and high-speed (8192 bps) communication modes without use of a command.

To begin with, the example of communicating processing to be performed with the communication mode fixed in the low-speed (2048 bps) communication mode will be described below. The communicating section b is initialized to operate in the high-speed (8192 bps) communication mode. The communicating section b is permitted in the initial state to autonomously switch transmission speeds. Therefore, when the communicating section b receives low-speed (2048 bps) communication data from the communicating section a, the communicating section b measures a pulse width of a signal representing the first frame 511 in the same manner as that described in the example of processing 1 or 2, and thus recognizes a transmission speed. In this example of processing, one frame is formed with one word alone, and used to complete recognition of a transmission speed.

In this case, the frame 511 received first is subjected to transmission speed recognizing processing. Communication data is not acquired, or in other words, the frame is not used as valid communication data. However, the second and subsequent frames 512, 513, etc. are frames to be treated with the transmission speeds switched based on the result of recognition, and the frames are used as valid communication data items. Incidentally, one frame is formed with one word.

Next, the example of processing to be performed as shown in FIG. 10B in order to switch the low-speed (2048 bps) and high-speed (8192 bps) communication modes in response to a command will be described below.

A high-speed (8192 bps) communication frame 521 which the communicating section b receives in the initial state (high-speed communication mode) is normally received by the communicating section b. Thereafter, the communicating section a uses multiple high-speed (8192 bps) communication frames 522 to transmit the command 00H to the communicating section b.

On receipt of the command 00H, the communicating section b lifts the autonomous transmission-speed switching inhibited state and changes to the permitted state. Thereafter, the communicating section b receives a low-speed (2048 bps) communication frame 523 from the communicating section a, and uses the frame 523 to recognize a transmission speed. The communicating section b measures a pulse width of a signal representing the frame 523 in the same manner as that described in the example or processing 1 or 2 in order to recognize the transmission speed. Through the recognizing processing, low-speed (2048 bps) communication is acknowledged, and the communication modes are switched from the high-speed communication mode to the low-speed (2048 bps) communication mode. Thereafter, communication is performed in the low-speed (2048 bps) communication mode.

Thereafter, the communicating section a transmits the command 00H to the communicating section b in the low-speed (2048 bps) communication mode. Transmitting processing is performed using a frame 524 or the like.

On receipt of the command 00H, the communicating section b lifts the autonomous transmission-speed switching inhibited state and changes to the permitted state. Thereafter, the communicating section b receives a high-speed (8192 bps) communication frame 525 from the communicating section a, and uses the frame 525 to recognize a transmission speed. The communicating section b measures a pulse width of a signal representing the frame 525 in the same manner as that described in the example of processing 1 or 2, and thus recognizes the transmission speed. Through the recognizing processing, high-speed (8192 bps) communication is acknowledged, and the communication modes are switched from the low-speed communication mode to the high-speed (8192 bps) communication mode. Thereafter, communication is performed in the high-speed (8192 bps) communication mode.

Next, the example of processing to be performed as shown in FIG. 10C in order to switch the low-speed 2048 bps) and high-speed (8192 bps) communication modes without use of a command will be described below.

A high-speed (8192 bps) communication frame 531 and others which the communicating section b receives in the initial state (high-speed communication mode) are normally received by the communicating section b. Thereafter, the communicating section a does not transmit any command but switches the transmission speeds, and transmits a low-speed (2048 bps) communication frame 532.

The communicating section b receives the high-speed communication mode frame 532, and acknowledges abnormal reception. At this time point, the communicating section b changes from the autonomous transmission-speed switching inhibited state to the permitted state. The communicating section b uses the next frame 533 to recognize a transmission speed, measures a pulse width in the same manner as that described in the example of processing 1 or 2, and thus recognizes the transmission speed. Through the recognizing processing, low-speed (2048 bps) communication is acknowledged, and the communication modes are switched from the high-speed communication mode to the low-speed (2048 bps) communication mode.

In this case, the frame 532 which the communicating section a receives first after switching to low-speed (2048 bps) communication is regarded as a result of abnormal reception. The next frame 533 is subjected to transmission speed recognizing processing. Communication data is not acquired, or in other words, the frame is not used as valid communication data. However, the subsequent frame 534 is a frame to be treated with the transmission speeds switched based on the result of recognition, and is used as valid communication data.

Further, the communicating section a switches to high-speed (8192 bps) communication so as to transmit the frame 535 and subsequent frames.

The communicating section b receives the high-speed communication frame 535 in the low-speed communication mode, and therefore acknowledges abnormal reception. At this time point, the communicating section b switches from the autonomous transmission-speed switching inhibited state to the permitted state. The communicating section b uses the next frame 536 to recognize a transmission speed, measures a pulse width in the same manner as that described in the example of processing 1 or 2, and thus recognizes the transmission speed. Through the recognizing processing, the communicating section b recognizes high-speed (8192 bps) communication, and switches communication modes from the low-speed communication mode to the high-speed (8192 bps) communication mode.

In this case, the frame 535 which the communicating section a first receives after switching to high-speed (8192 bps) communication is regarded as a result of abnormal reception. The next frame 536 is subjected to transmission speed recognizing processing. Communication data is not acquired, or in other words, the frame is not used as valid communication data. However, the subsequent frames 534 are frames to be treated with the transmission speeds switched based on the result of recognition, and are used as valid communication data items.

(5) Details of Processing to be Performed by the Data Communication Device

Next, referring to FIG. 11, the relationships of associations between the components of the communicating section b 200 and pieces of processing will be described below.

In the initial state, the communication execution unit 210 transmits or receives data in the high-speed (8192 bps) communication mode. Specifically, data to be outputted via the output block 211 is outputted as serial communication data having a word or a frame defined therein in units of a bit width compatible with high-speed (8192 bps) communication. Serial communication data to be inputted via the input block 212 is analyzed in units of the bit width compatible with high-speed (8192 bps) communication in order to discriminate the start bit, data, or the like. Thus, the data is acquired. A command to be outputted first from the output block 211 in the initial state shall be the command 00H.

The bit variance detection block 221 included in the interrupt processing unit 220 performs fall detecting processing in the initial state, and is set to an interrupt permitted state.

In the initial state, the time measurement block 231 included in the timer 230 is placed in a stopped state.

In the initial state, serial communication data is inputted from the communicating section a that is a remote communicating party. The input data shall be input data 501 shown in part A of FIG. 11. At a bit position associated with a time instant t1, the potential on a signal line makes a transition from a high level to a low level, that is, makes a fall.

The input data is inputted to the bit variance detection block 221 included in the interrupt processing unit 220 along a path I shown in FIG. 11. The bit variance detection block 221 is configured to detect a fall in the initial state. The fall occurring at the time instant t1 is then detected. Detected information is inputted to the transmission speed calculation block 241 included in the control unit 240 along paths H and L.

With the detection of the fall of a signal representing input data as a trigger, the transmission speed calculation block 241 included in the control unit 240 instructs the time measurement block 231 included in the timer 230 to initiate time measurement by way of paths M and J. This processing is the beginning of low-level pulse width measuring processing. Further, the transmission speed calculation block 241 included in the control unit 240 changes the setting of the bit variance detection block included in the interrupt processing unit 220 to the setting, in which the bit variance detection block 221 is placed in a rise detection/interrupt permitted state, along with initiation of the time measurement.

Thereafter, at a position associated with a time instant t2 shown in part A of FIG. 11, the potential on the signal line makes a transition from the low level to the high level according to a data bit in the first word 0 of the frame, that is, makes a rise.

The input data is inputted to the bit variance detection block 221 included in the interrupt processing unit 220 along the path I shown in FIG. 11. The bit variance detection block 221 is configured to detect a rise at this time point. The rise occurring at the time instant t2 is therefore detected. Detected information is inputted to the transmission speed calculation block 241 included in the control unit 240 along the paths H and L.

With the detection of the rise of the signal representing the input data as a trigger, the transmission speed calculation block 241 included in the control unit 240 instructs the time measurement block 231 included in the timer 230 to terminate time measurement by way of the paths M and J. The measured time T12 that has been measured until this time point is inputted as a low-level pulse width (low-level pulse duration) to the transmission speed calculation block 241 included in the control unit 240 along the paths K and L. Thus, the low-level pulse width is measured. Further, the transmission speed calculation block 241 included in the control unit 240 changes the setting of the bit variance detection block 221 included in the interrupt processing unit 220 to the setting, in which the bit variance detection block 221 is placed in a fall detection/interrupt permitted state, along with the termination of the time measurement, resets the measured time, which the time measurement block has measured, to 0, and resumes time measurement. The measurement is measurement of a high-level pulse duration.

The transmission speed calculation block 241 included in the control unit 240 regards the inputted measured time T12 as a low-level pulse width (low-level pulse duration) so as to recognize the transmission speed for the input data. The recognizing processing is carried out as the processing of obtaining the result of recognition, which is listed in part B3 of FIG. 5B, on the basis of the low-level pulse width shown in part B2 of FIG. 5B.

More particularly, as described previously, when the time T12 that is the low-level pulse width (low-level pulse duration) beginning at the trailing edge of a pulse representing a start bit in the first word 0 of the frame (a point of a transition from the high level to the low level) lasts until any of the positions of the first to third bits (bits 0 to 2) in the word of high-speed (8192 bps) communication data, any of the positions of the fifth to seventh bits (bits 4 to 6) in the word of high-speed (8192 bps) communication data, or the position of the stop bit in the word of undergone high-speed (8192 bps) communication data, the transmission speed is recognized as the high speed (8192 bps).

In any other cases, the transmission speed is recognized as the low speed (2048 bps). Specifically, when the low-level pulse width (low-level pulse duration) beginning at the trailing edge of a pulse representing the start bit in the first word 0 of the frame (a point of a transition from the high level to the low level) lasts until the position of the fourth bit (bit 3) in the word of high-speed (8192 bps) communication data, the position of the eight bit (bit 7) in the word of high-speed (8192 bps) communication data, or at a position beyond the stop bit position in the word of high-speed (8192 bps) communication data, the transmission speed is recognized as the low speed (2048 bps).

More particularly, for example, when the time T12 falls within one bit width (488 μsec±60 μsec) compatible with the low speed (2048 bps), or two bit widths (976 μsec±60 μsec), if the communicating section b is placed in the autonomous transmission-speed switching permitted state, the processing of switching the communication modes from the high-speed (8192 bps) communication mode to the low-speed (2048 bps) communication mode is carried out. A switching control notification is issued from the control unit 240 to the transmission speed designation block 213, which is included in the communication execution unit 210, along the paths M and C.

Based on the notification sent from the control unit, the transmission speed designation block 213 performs the processing of switching the communication modes from the high-speed (8192 bps) communication mode to the low-speed (2048 bps) communication mode. More particularly, serial communication data outputted via the output block 211 is restructured into transmission data compatible with the low-speed (2048 bps) communication mode. Further, analysis of serial communication data inputted via the input block 212 is changed to analysis thereof to be performed in the low-speed (2048 bps) communication mode.

When the current setting of the communicating section b is the setting for the low-speed (2048 bps) communication mode, if the time T12, that is, the time T12 corresponding to the low-level pulse width (low-level pulse duration) beginning at the trailing edge of a pulse representing the start bit in the first word 0 of a frame (a point of a transition from the high level to the low level) lasts until the position of any of the first to third bits (bits 0 to 2) in the word of high-speed (8192 bps) communication data, the position of any of the fifth to seventh bits (bits 4 to 6) in the word of high-speed (8192 bps) communication data, or the position of the stop bit in the word of high-speed (8192 bps) communication data, the transmission speed is recognized as the high speed (8192 bps). Therefore, the processing of changing the communication modes from the low-speed (2048 bps) communication mode to the high-speed (8192 bps) communication mode is carried out.

Further, at the position associated with a time instant t3 shown in part A of FIG. 11, the potential on the signal line falls. The falling signal is inputted to the bit variance detection block 221 included in the interrupt processing unit 220 along the path I, whereby the fall is detected. Detected information is inputted to the transmission speed calculation block 241 included in the control unit 240 along the paths H and L.

With the detection of the fall of the signal representing the input data as a trigger, the transmission speed calculation block 241 included in the control unit 240 instructs the time measurement block 231 included in the timer 230 to terminate time measurement by way of the paths M and J. The measured time T23 that has been measured at the time instant t3 is inputted to the transmission speed calculation block 241 included in the control unit 240 as a high-level pulse width (high-level pulse duration) along the paths K and L. The transmission speed calculation block 241 included in the control unit 240 changes the setting of the bit variance detection block 221 included in the interrupt processing unit 220 into the setting, in which the bit variance detection block 221 is placed in the rise detection/interrupt permitted state, along with the termination of the time measurement, resets the measured time, which the time measurement block has measured, to 0, and resumes measurement. The measurement is measurement of a low-level pulse duration.

If the high-level pulse width T23 exceeds a time of an interval serving as a reference for a frame interval, the transmission speed calculation block 241 included in the control unit recognizes the high-level pulse width or spacing as a frame spacing. The fall is recognized as the position of the trailing edge of the pulse representing the start bit in the first word (word 0) of the frame. In this case, the speed recognizing processing based on the low-level pulse width beginning at the trailing edge of the pulse is carried out. The speed recognizing processing is the processing performed at the time instant t1 as described previously.

In the example shown in FIG. 11, the fall at the time instant t3 corresponds to the trailing edge of the pulse representing a data bit. The time T23 is not the time corresponding to a frame interval. Therefore, the foregoing interpretation is not applied. When processing is performed in the same manner as the aforesaid example of processing 1, measurement of a high-level pulse width is repeatedly executed. When the high-level pulse width equals a time corresponding to the frame interval, the speed recognizing processing based on the low-level pulse width beginning at the trailing edge of the pulse is carried out.

However, when processing is performed in the same manner as the aforesaid example of processing 2, all low-level pulse widths are measured. In this case, the control unit 240 instructs the time measurement block 231 included in the timer 230 to initiate measurement of a low-level pulse width beginning at the time instant t3. Further, the transmission speed calculation block 241 included in the control unit 240 changes the setting of the bit variance detection block 221 included in the interrupt processing unit 220 to the setting, in which the bit variance detection block 221 is placed in the rise detection/interrupt permitted state, along with the initiation of the time measurement.

Next, at the position associate with a time instant t4 shown in part A of FIG. 11, the potential on the signal line makes a transition from the low level to the high level according to a data bit, that is, makes a rise. The input data is inputted to the bit variance detection block 221 included in the interrupt processing unit 220 along the path I shown in FIG. 11. The bit variance detection block 221 is configured to detect a rise at this time point. Therefore, a rise occurring at a time t2 is detected. Detected information is inputted to the transmission speed calculation block 241 included in the control unit 240 along the paths H and L.

With the detection of the rise of the signal, which represents the input data, as a trigger, the transmission speed calculation block 241 included in the control unit 240 instructs the time measurement block 231 included in the timer 230 to terminate time measurement by way of the paths M and J. The measured time T34 that has been measured at the time instant t4 is inputted to the transmission speed calculation block 241 included in the control unit 240 as a low-level pulse width (low-level pulse duration) along the paths K and L. Further, the transmission speed calculation block 241 included in the control unit 240 changes the setting of the bit variance detection block 221 included in the interrupt processing unit 220 into the setting, in which the bit variance detection block 221 is placed in the fall detection/interrupt permitted state, along with the termination of the time measurement, resets the measured time, which the time measurement block has measured, to 0, and resumes measurement. The measurement is measurement of a high-level pulse duration.

The transmission speed calculation block 241 included in the control unit 240 uses the input measured time T34 as a low-level pulse width (low-level pulse duration), and recognizes the transmission speed for the input data. The recognizing processing is performed as the processing of obtaining a result of recognition, which is listed in part B3 of FIG. 5B, on the basis of the low-level pulse width shown in part B2 of FIG. 5B. The processing corresponds to the aforesaid example of processing 2.

The processing to be performed between time instants t4 and t5 is identical to the one performed between the time instants t2 and t3, and the processing to be performed between time instants t5 and t6 is identical to the one performed between the time instants t3 and t4.

The processing to be performed between time instants t6 and t8 is identical to the one performed between the time instants t2 and t3, and is measurement of a high-level pulse width. However, if a time T68 is recognized to be equivalent to a frame interval during high-level pulse width measuring processing performed between the time instants t6 and t8, a fall at the time instant t8 is recognized as the trailing edge of the pulse representing the first start bit in a frame. Transmission speed recognizing processing based on a low-level pulse width is carried out in the same manner as the example of processing 1 or 2.

If the time T68 is recognized not to be equivalent to the frame interval, the fall at the time instant t8 is recognized not to be the trailing edge of the pulse representing the first start bit in the frame. According to the example of processing 1, transmission speed recognizing processing based on a low-level pulse width is not carried out. According to the example of processing 2, the transmission speed recognizing processing based on a measured low-level pulse width is carried out.

At a time point at which one word comes to an end, for example, at a time instant t7, whether communication data is normally received or abnormally received is decided. In case of normal reception, whether the timing of inputting serial communication data or the timing of outputting serial communication data has come is decided. The deciding processing is performed by the control unit 240. Based on the decision made by the control unit 240, a control signal is outputted to the communication execution unit 210. Communication is executed in response to the control signal.

According to the state of normal reception or abnormal reception, the control unit 240 switches the setting in which autonomous transmission-speed switching is inhibited, and the setting in which autonomous transmission-speed switching is permitted. The switching is processing dependent on a kind of command. Processing described with reference to FIG. 7B is executed.

As described previously, when the communication suspended time exceeds a certain period of time, the setting in which autonomous transmission-speed switching is inhibited is switched to the setting in which the autonomous transmission-speed switching is permitted in the same manner as that performed in response to the command 00H. The communication suspended time is measured by the time measurement block 231, which is included in the timer 230, under the control of the control unit 240, and the result of the measurement is fed to the control unit 240. The control unit 240 decides whether the communication suspended time exceeds the certain period of time. If the control unit 240 decides that the communication suspended time exceeds the certain period of time, the control unit 240 switches the setting, in which autonomous transmission-speed switching is inhibited, to the setting, in which the autonomous transmission-speed switching is permitted, in the same manner as it does in response to the command 00H.

(6) Processing Sequence to be Followed by the Data Communication Device

Next, referring to the flowcharts of FIG. 12 to FIG. 14, a processing sequence to be followed by the communicating section b 200 will be described below. The flowcharts of FIG. 12 to FIG. 14 describe pieces of processing. Namely, FIG. 12 is the flowchart describing overall processing, FIG. 13 is the flowchart describing processing to be performed with data reception in the communication execution unit 210 as a trigger, and FIG. 14 is the flowchart describing processing to be performed with processing in the interrupt processing unit 220 as a trigger.

Figure 13:
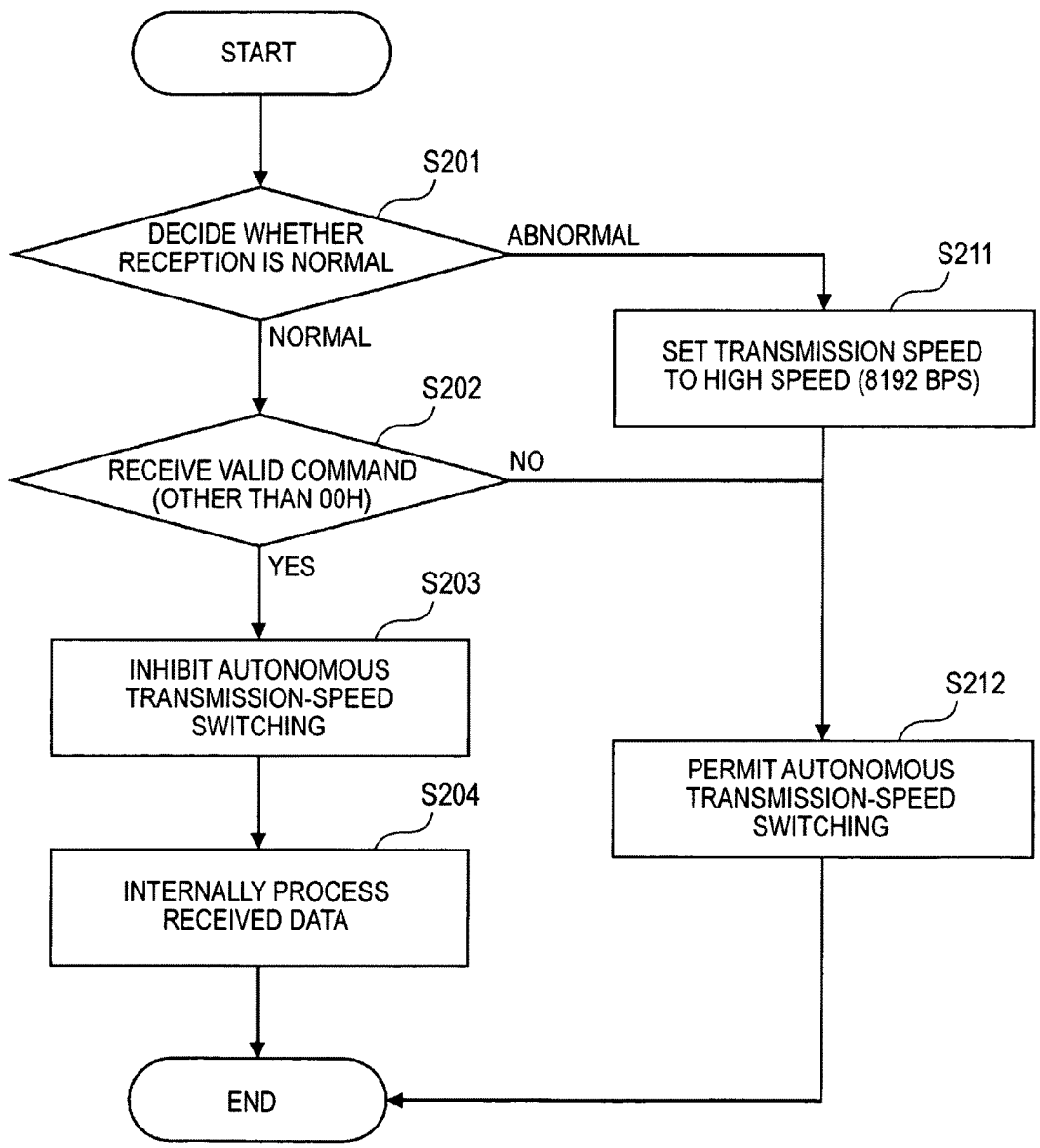
FIG. 13 is a diagram showing a flowchart describing a processing sequence to be followed by the data communication device according to the embodiment of the present invention.
Figure 14:
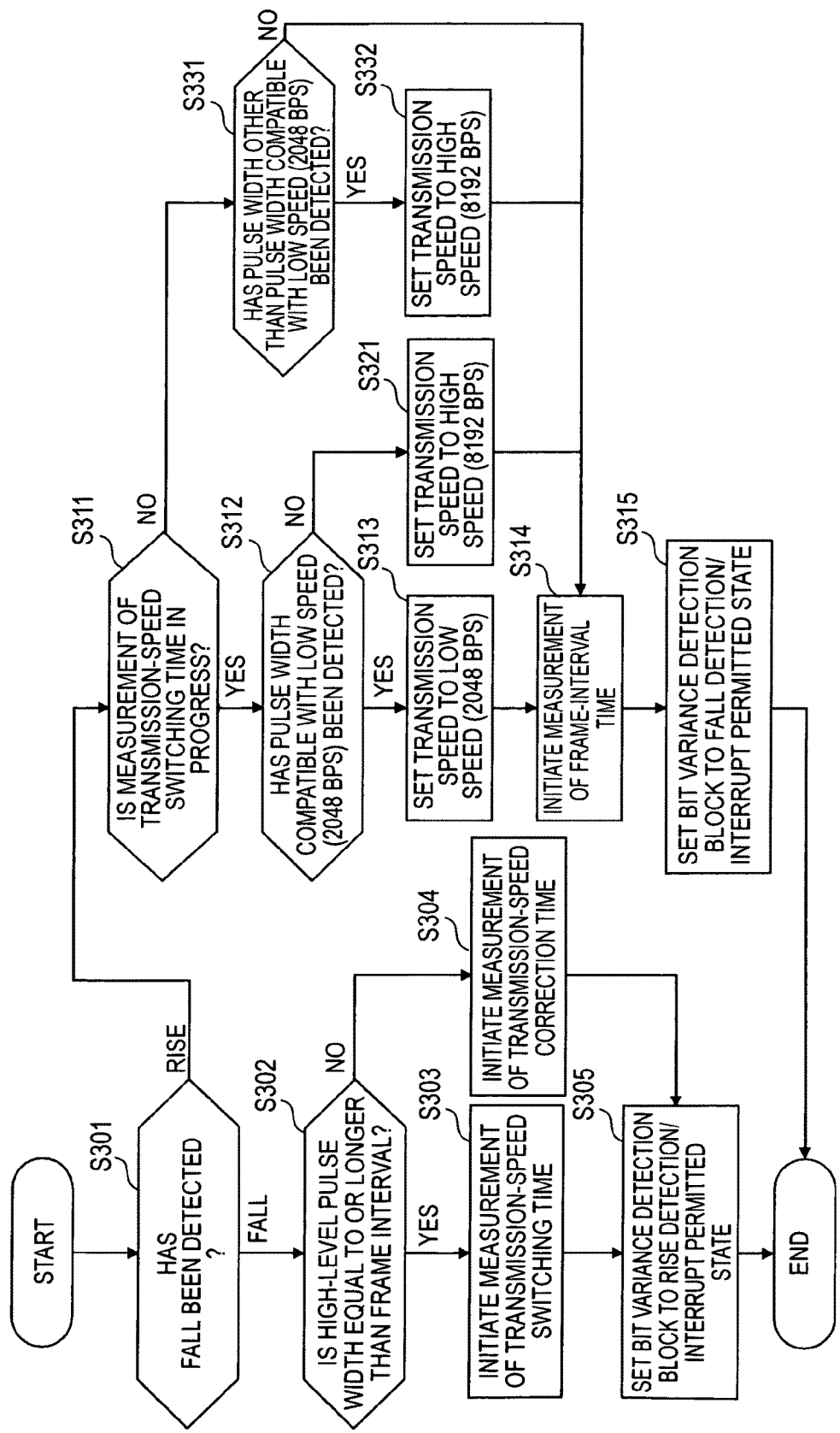
FIG. 14 is a diagram showing a flowchart describing a processing sequence to be followed by the data communication device according to the embodiment of the present invention.

The pieces of processing described in FIG. 12 to FIG. 14 are performed under the control of the control unit 240. More particularly, various control commands are outputted to the processing units, that is, the communication execution unit 210, interrupt processing unit 220, and timer 230 according to programs stored in the memory in the control unit 240. Thus, the processing units are controlled.

To begin with, a description will be made in conjunction with the flowchart of FIG. 12 describing overall processing. Steps S101 to S103 in FIG. 12 are initialization steps which the communicating section b 200 follows to initiate communicating processing.

Step S101 is a step of initializing the communication execution unit 210. At step S101, first, a transmission speed to be applied to the transmission speed designation block 213 included in the communication execution unit 210 is set to the high speed (8192 bps). Further, the communication execution unit 210 is configured to have autonomous switching of transmission speeds permitted.

Step S102 is a step of initializing the timer 230. The time measurement block 231 included in the timer 230 has all count values cleared to 0s. Incidentally, the timer 230 may be configured to have the upper limit of a time measurement period determined. Namely, if the time measurement period exceeds the predetermined upper limit, the timer 230 autonomously executes the processing of suspending time measurement and resetting the count values to 0s.

Step S103 is a step of initializing the interrupt processing unit 220. At step S103, an object of detection to be performed by the bit variance detection block 231 included in the interrupt processing unit 230 is set to a fall, that is, a transition of the potential on a signal line from the high level to the low level. Further, the interrupt processing unit 220 is set to an interrupt permitted state.

After the completion of the pieces of initializing processing, communicating processing is executed at step S104. Specifically, communication with the communicating section a1 110 or the communicating section a2 120 shown in FIG. 2 is initialized. At step S105, termination of the communicating processing is verified. If the communicating processing continues, the communicating processing of step S104 is continued. If the termination is recognized, the processing is terminated.

Next, referring to the flowchart shown in FIG. 13, a description will be made of a processing sequence in which pieces of processing are executed with data reception, which is performed in the communication execution unit 210 executing communicating processing, as a trigger. The pieces of processing described in FIG. 13 are performed mainly in the communication execution unit 210 and control unit 240 with data reception, which is performed in the communication execution unit 210, as a trigger.

At step S201, whether serial communication data has been normally received is decided. Whether serial communication data has been normally received is decided by deciding whether discriminating a start bit, data, and a stop bit from received data has succeeded and the data has been acquired. Incidentally, in an initial stage, the communicating section b 200 is set to the high-speed (8192 bps) communication mode. Therefore, if data received from a remote communicating party is high-speed (8192 bps) communication data, the communicating section b 200 can normally receive the data. However, if the data received from the remote communicating party is low-speed (2048 bps) communication data, the communicating section b 200 fails to normally receive the data. Abnormal reception ensues.

If a decision is made that serial communication data has been normally received, the process proceeds to step S202. At step S202, whether a kind of command contained in the normally received data is other than the command 00H is decided.

As described with reference to FIGS. 7A and 7B, the kinds of commands presented below shall be defined.

The command 00H signifies that no processing should be performed (the communication system should be reset), the command 10H signifies that control data should be transmitted from the communicating section a (master) to the communicating section b (slave), and the command 20H signifies that control data should be transmitted from the communicating section b (slave) to the communicating section a (master).

Each of the commands 10H and 20H signifies the pieces of specific processing. When either of the commands is received, it means that data transmission/reception has been achieved in a communication mode adopted in common by both the communicating sections a and b. Therefore, autonomous switching of transmission speeds becomes unnecessary until the communicating sections a and b are disconnected thereafter, and a transmission speed is fixed. This processing is the processing to be performed at step S203.

At step S203, autonomous switching of transmission speeds is inhibited. Thereafter, at step S204, processing is performed on the received data. For example, processing associated with a command is carried out.

In contrast, if a decision is made at step S202 that the received command is the command 00H, the process proceeds to step S212. At step S212, autonomous switching of transmission speeds is permitted. The processing is the processing described with reference to FIGS. 7A and 7B and performed in response to the command 00H. As described previously, for example, after the communicating section a transmits the command 00H, the communicating section a switches the transmission speeds.

Further, if a decision is made at step S201 that normal reception of serial communication data has failed, the process proceeds to step S211. At step S211, the transmission speed is set to the high speed (8192 bps) that is initially designated. At step S212, autonomous switching of transmission speeds is permitted. Thereafter, the data to be received is used to perform the aforesaid transmission-speed recognizing processing.

Next, referring to the flowchart shown in FIG. 14, a description will be made of a processing sequence in which pieces of processing are executed with processing performed by the interrupt processing unit 220 as a trigger. The pieces of processing described in FIG. 14 are executed mainly in the interrupt processing unit 220 and control unit 240 with bit variance detection, which is performed in the bit variance detection block 221 included in the interrupt processing unit 220, as a trigger.

First, at step S301, the bit variance detection block 221 included in the interrupt processing unit 220 decides whether a fall of a received signal or a rise thereof has been detected. If the fall has been detected, the process proceeds to step S302. If the rise has been detected, the process proceeds to step S311.

If the fall of the received signal has been detected, the process proceeds to step S302. At step S302, a measured time having been measured along with the fall, or in this case, a time corresponding to a high-level pulse width is compared with a frame interval preserved in advance. This processing is performed by the control unit 240. Data concerning the frame interval is preserved in the memory in the control unit. If the decision of step S302 is Yes, that is, if a decision is made that the high-level pulse width is equal to or longer than the frame interval, the process proceeds to step S303.

At step S303, measurement of a transmission-speed switching time is initiated. This processing is performed based on a decision made that the fall detected at step S301 corresponds to the trailing edge of a pulse representing a start bit in the first word of a frame. Namely, the processing is the processing of initiating measurement of a low-level pulse width, which begins at the trailing edge of the pulse representing the start bit in the word 0, described in relation to the example of processing 1 or 2.

At step S305, the bit variance detection block 221 included in the interrupt processing unit 220 is set to the interrupt permitted state in which the bit variance detection block detects a rise. Owing to the setting, the bit variance detection block 221 in the interrupt processing unit 220 detects a rise of the received signal (a terminal edge of a low-level pulse) and feeds the information to the control unit 240.

If a decision is made at step S302 that the time corresponding to the high-level pulse width is not equal to or longer than the frame interval, the process proceeds to step S304. At step S304, measurement of a transmission-speed correction time is initiated. This processing corresponds to the example of processing 2, that is, the processing of measuring all low-level pulse widths in a word. Thereafter, the process proceeds to step S305, and the bit variance detection block 221 included in the interrupt processing unit 220 is set to the interrupt permitted state in which the bit variance detection block detects a rise. Owing to the setting, the bit variance detection block 221 included in the interrupt processing unit 220 detects a rise of the received signal (a terminal edge of a low-level pulse), and feeds the information to the control unit 240.

If the bit variance detection block 221 included in the interrupt processing unit 220 detects a rise of the received signal at step S301, the process proceeds to step S311. At step S311, whether measurement of a transmission-speed switching time is in progress is decided. Namely, whether measurement of a low-level pulse width is in progress is decided.

If the decision made at step S311 is Yes, that is, measurement of a transmission-speed switching time is in progress, the process proceeds to step S312. At step S312, whether the measured low-level pulse width is a pulse width compatible with low-speed (2048 bps) communication is decided. The deciding processing corresponds to the recognizing processing described with reference to FIGS. 5A and 5B.

Specifically, if the measured low-level pulse width corresponds to any of one to three bit widths in high-speed (8192 bps) communication data or any of five to seven bit widths therein, high-speed (8192 bps) communication is acknowledged. If the measured low-level pulse width corresponds to four bit widths in high-speed (8192 bps) communication data, eight bit widths therein (one bit width or two bit widths in low-speed (2048 bps) communication data), or more bit widths, low-speed (2048 bps) communication is acknowledged.

If a decision is made during deciding processing, which is performed at step S312, that a low-level pulse width compatible with the low speed (2048 bps) has been detected, the process proceeds to step S313. At step S313, the transmission speed is set to the low speed (2048 bps).

On the other hand, if a decision is made during deciding processing, which is performed at step S312, that a low-level pulse width compatible with the low speed (2048 bps) has not been detected, the process proceeds to step S321. At step S321, the transmission speed is set to the high speed (8192 bps).

Thereafter, the process proceeds to step S314, and frame-interval time measurement is initiated. Namely, measurement of a high-level pulse duration is initiated. At step S315, the bit variance detection block 221 included in the interrupt processing unit 220 is set to an interrupt permitted state in which the bit variance detection block detects a fall. Owing to the setting, the bit variance detection block 221 included in the interrupt processing unit 220 detects a fall of the received signal (a terminal edge of a high-level pulse), and feeds the information to the control unit 240.

In contrast, if the decision made at step S311 is No, that is, measurement of a transmission-time switching time is not in progress, the process proceeds to step S331. This refers to a case where a transmission-speed correction time is being measured, that is, a period during which a low-level pulse width other than a low-level pulse spacing beginning with a pulse, which represents the start bit in a leading word of a frame, is measured as described in relation to the example of processing 2.

At step S331, whether a pulse width other than a pulse width compatible with the low speed (2048 bps) has been detected is decided. If the decision is Yes, communication is recognized as high-speed (8192 bps) communication. At step S332, the transmission speed is set to the high speed (8192 bps).

Thereafter, the process proceeds to step S314, and measurement of a frame-interval time is initiated. Namely, measurement of a high-level pulse spacing is initiated. At step S315, the bit variance detection block 221 included in the interrupt processing unit 220 is set to an interrupt permitted state in which the bit variance detection block detects a fall. Owing to the setting, the bit variance detection block 221 included in the interrupt processing unit 220 detects a fall of the received signal (a terminal edge of a high-level pulse), and feeds the information to the control unit 240.

Through the foregoing pieces of processing, a low-level pulse width or a high-level pulse width is measured at any time, and the transmission speeds are autonomously switched.

The application of a data communication device in accordance with the embodiment of the present invention provides an advantage described below. For example, when the data communication device is utilized as a communicating section of a battery connected to a camera, a battery capable of being attached to either a camera that can perform high-speed communication or a camera that can perform low-speed communication alone can be realized. A battery compatible with various pieces of equipment can be produced. Autonomous speed switching processing in accordance with the embodiment of the present invention can be implemented by modifying a program without the necessity of drastically modifying an ongoing hardware configuration, that is, can be implemented without an increase in a cost.

Referring to the specific embodiment, the present invention has been described so far. However, it is apparent that a person with ordinary skill in the art can correct the embodiment or produce a substitute without a departure from the gist of the invention. The present invention has been disclosed by presenting an example, but should not be interpreted in a limited manner. For a better understanding of the gist of the invention, Claims should be referred to.

The series of pieces of processing described in this specification can be implemented using hardware, software, or a combination of hardware and software. For implementing the pieces of processing by software, a program in which a processing sequence is described is installed in a memory in a computer incorporated in dedicated hardware. Otherwise, the program is installed in a general-purpose computer capable of executing various pieces of processing. For example, the program may be recorded in advance in a recording medium. Aside from installation from the recording medium into the computer, the program may be received over a network such as a local area network (LAN) or the Internet, and then installed in a recording medium such as a built-in hard disk.

Various pieces of processing described in this specification may not only be executed time-sequentially as described therein but also be executed in parallel with one another or independently of one another according to the throughput of a device that executes the pieces of processing, or according to the necessity of execution. In this specification, what is referred to as a system is a logical conglomerate of multiple apparatuses and devices but is not limited to an entity having all the apparatuses and devices integrated into the same housing.

As described so far, according to the embodiment of the present invention, in a communication device that performs serial communication of an asynchronous type, a variance between bits in communication data received from a remote communicating party is detected in order to measure a low-level pulse width that is a low-level pulse duration. Based on a decision made on whether the measured low-level pulse width is a low-level pulse width equivalent to a bit width compatible with low-speed communication data, whether the communication data is high-speed communication data or low-speed communication data is decided. Owing to this constitution, a transmission speed for communication data received from a remote communicating party whose transmission speed is unknown can be detected. Control can be implemented in order to switch transmission speeds so as to achieve communication at the transmission speed corresponding to the transmission speed employed by the remote communicating party.

It should be understood by those skilled in the art that various modifications, combinations, sub-combinations and alterations may occur depending on design requirements and other factors insofar as they are within the scope of the appended claims or the equivalents thereof.

What is claimed is:

1. A data communication device comprising:
    a communication execution unit operable to execute serial communication of an asynchronous type and receive serial communication data from a remote communicating party;
    a bit variance detection block operable to:
        detect a variance between bits in the received serial communication data, wherein the detected variance comprises a transition from a low-level bit to a high-level bit in a word of the serial communication data; and
        generate one or more interrupt signals based on a position of the transition from the low-level bit to the high-level bit in the word of the serial communication data, wherein said generated one or more interrupt signals cause a timer to initiate and terminate time measurement to measure a low-level pulse width of the word of the serial communication data; and
    a control unit operable to:
        recognize a transmission speed of the serial communication data based on a confirmation whether the measured low-level pulse width is equivalent to a predefined width of one or more bits of one of low-speed communication data or high speed communication data; and
        discriminate a start bit and a first data bit in the word of the serial communication data based on the recognized transmission speed.

2. The data communication device according to claim 1, wherein when the data communication device is set to a high-speed communication mode, if the control unit recognizes the transmission speed for the serial communication data as low speed, the control unit is operable to change the communication mode to a low-speed communication mode.

3. The data communication device according to claim 1, wherein based on the confirmation that the low-level pulse width is not equivalent to a predefined width of one or more bits of low-speed communication data, the control unit recognizes the transmission speed for the serial communication data as high speed.

4. The data communication device according to claim 3, wherein when the data communication device is set to a low-speed communication mode, if the control unit recognizes the transmission speed for the communication data as the high speed, the control unit is operable to change the communication mode to the high-speed communication mode.

5. The data communication device according to claim 1, wherein the control unit is operable to:
    input detected information on a fall of a signal, which represents the communication data, from the bit variance detection block;
    instruct the timer to initiate time measurement with the detection of the fall of the signal as a trigger;

input detected information on a rise of the signal, which represents the communication data, from the bit variance detection block;

instruct the timer to terminate time measurement with the detection of the rise of the signal as a trigger; and acquire information on the low-level pulse width based on the time measurement.

6. The data communication device according to claim 1, wherein the control unit is operable to:

input detected information on a fall of a signal, which corresponds to the position of the beginning of a start bit in a leading word of a frame of serial communication data, from the bit variance detection block;

instruct the timer to initiate time measurement with the detection of the fall of the signal as a trigger;

input detected information on a rise of the signal, which represents the communication data, from the bit variance detection block;

instruct the timer to terminate time measurement with the detection of the rise of the signal as a trigger; and acquire information on the low-level pulse width based on the time measurement.

7. The data communication device according to claim 1, wherein the control unit comprises a table, wherein the table comprises a plurality of values of the low-level pulse width listed in association with high-speed communication or low-speed communication, wherein the values are used as data in deciding whether the serial communication data is high-speed communication data or low-speed communication data; and wherein the control unit references the table to recognize transmission speed of the serial communication data according to the low-level pulse width measured by the timer.

8. The data communication device according to claim 1, wherein the control unit is operable to change between a transmission-speed switching permitted mode and a transmission-speed switching inhibited mode in response to a command contained in the communication data.

9. The data communication device according to claim 1, wherein the data communication device is a battery that includes a communicating section, and wherein the battery is attachable or detachable to or from a main body of an information processing system, and executes communicating processing for the remote communicating party.

10. The data communication device according to claim 9, wherein the remote communicating party is a camera to which the battery is attached.

11. A communication control method to be implemented in a data communication device, comprising:

causing a communication execution unit to execute serial communication of an asynchronous type and receive serial communication data from a remote communicating party;

causing a bit variance detection block to:

detect a variance between bits in the received serial communication, wherein the detected variance comprises a transition from a low-level bit to a high-level bit; and generate one or more interrupt signals based on a position of the transition from the low-level bit to the high-level bit in the word of the serial communication data, wherein said generated one or more interrupt signals cause a timer to initiate and terminate time measurement to measure a low-level pulse width of a word of the serial communication data; and causing a control unit to:

recognize a transmission speed of the serial communication data, and change communication modes according to a result of the recognition, wherein the step of causing the control unit to recognize the transmission speed comprises recognizing the transmission speed on the basis of a confirmation whether the measured low-level pulse width is equivalent to a predefined width of one or more bits of one of low-speed communication data or high speed communication data; and discriminate a start bit and a first data bit in the word of the serial communication data based on the recognized transmission speed.

12. A non-transitory computer-readable storage medium having stored thereon, a computer program having at least one code section for communication, the at least one code section being executable by a computer for causing the computer to perform steps comprising:

causing a communication execution unit to execute serial communication of an asynchronous type and receive serial communication data from a remote communicating party;

causing a bit variance detection block to:

detect a variance between bits in the received serial communication, wherein the detected variance comprises a transition from a low-level bit to a high-level bit; and generate one or more interrupt signals based on a position of the transition from the low-level bit to the high-level bit in the word of the serial communication data, wherein said generated one or more interrupt signals cause a timer to measure a low-level pulse width of a word of the serial communication data; and causing a control unit to:

recognize a transmission speed of the serial communication data, and change communication modes according to a result of recognition, wherein the step of causing the control unit to recognize the transmission speed comprises recognizing the transmission speed on the basis of a confirmation whether the measured low-level pulse width is equivalent to a predefined width of one or more bits of one of low-speed communication data or high speed communication data; and discriminate a start bit and a first data bit in the word of the serial communication data based on the recognized transmission speed.

13. The data communication device according to claim 1, wherein the control unit is configured to autonomously switch transmission speeds of the communication execution unit for changing the communication mode of the data communication device based on the recognition of the transmission speed at which the serial communication data is received.

14. The data communication device according to claim 1, wherein the control unit designates whether the bit variance detection block detects a leading edge of a pulse representing a transition from the low-level bit to the high-level bit as the variance between bits or the bit variance detection block detects a trailing edge of a pulse representing a transition from a high-level bit to a low-level bit as the variance between bits.

15. The data communication device according to claim 1, wherein the control unit comprises a table, wherein the table comprises a plurality of values of a low-level pulse width listed in association with high-speed communication or low-speed communication, wherein the values are used as data in deciding whether the serial communication data is high-speed communication data or low-speed communication data, wherein the table lists the values of the low-level pulse width in terms of bit configurations of a leading word of a frame of the communication data applicable to high-speed communication or low-speed communication.

16. The data communication device according to claim 15, wherein the control unit is operable to designate one or more predetermined bit configurations in the leading word of the frame of the received serial communication data as inhibited bit configurations for the recognition of the transmission speed as high speed communication.

17. The data communication device according to claim 1, wherein the communication execution unit is operable to initially set the data communication device to a high-speed communication mode.

18. The data communication device according to claim 1, wherein the timer begins measurement on an assumption that the serial communication data received from the remote communicating party is high-speed communication data.

* * * * *